United States Patent

Suzuki et al.

[11] Patent Number: 5,844,744
[45] Date of Patent: Dec. 1, 1998

[54] HEAD POSITIONING CONTROL APPARATUS OF DISK DRIVE AND METHOD OF CONTROLLING THE SAME APPARATUS

[75] Inventors: Nobuyuki Suzuki, Kawasaki; Shuichi Hashimoto, Tokyo; Toshio Negoro, Kawasaki, all of Japan

[73] Assignee: Fujitsu Limited, Kawasaki, Japan

[21] Appl. No.: 820,637

[22] PCT Filed: Jun. 27, 1990

[86] PCT No.: PCT/JP91/00870

§ 371 Date: Oct. 18, 1993

§ 102(e) Date: Oct. 18, 1993

[87] PCT Pub. No.: WO92/11636

PCT Pub. Date: Jul. 9, 1992

[30] Foreign Application Priority Data

Dec. 21, 1990 [JP] Japan ..................................... 2-412637
Dec. 21, 1990 [JP] Japan ..................................... 2-412638

[51] Int. Cl.⁶ ..................................................... G11B 5/55
[52] U.S. Cl. .................................... 360/78.09; 360/78.04; 360/78.14
[58] Field of Search ............................. 360/78.09, 78.04, 360/77.08, 77.05, 77.07, 78.14

[56] References Cited

U.S. PATENT DOCUMENTS

| | | | |
|---|---|---|---|
| 4,488,189 | 12/1984 | Axmear et al. | 360/78.04 |
| 4,679,103 | 7/1987 | Workman | 360/78.07 |
| 4,879,612 | 11/1989 | Freeze et al. | 360/78.09 X |
| 4,894,599 | 1/1990 | Ottesen et al. | 360/78.09 X |
| 4,954,909 | 9/1990 | Sengoku | 360/78.04 |

FOREIGN PATENT DOCUMENTS

| | | |
|---|---|---|
| 308 062 | 3/1989 | European Pat. Off. . |
| 336 037 | 10/1990 | European Pat. Off. . |
| 59-500391 | 3/1984 | Japan . |
| 62-257682 | 11/1987 | Japan . |
| 2-304777 | 12/1990 | Japan . |

OTHER PUBLICATIONS

Chiang, "Multirate State–Space Digital Controller for Sector Servo Systems" IEEE Proceedings of the 29th Conference on Decision and Control, pp. 1902–1907.

MEE et al. "vol. II; Computer Data Storage", 1988, pp. 53–84. McGraw Hill, Inc.

Patent Abstracts of Japan, vol. 12, 331 (P–755), Sep. 1988 & JP A–63 094 478 25 Apr. 1988 (abstract).

*Primary Examiner*—Aristotelis M. Psitos
*Assistant Examiner*—James L Habermehl
*Attorney, Agent, or Firm*—Staas & Halsey

[57] ABSTRACT

A head positioning apparatus and method for a disk drive system. During each computing time of a plurality of sequential computing times: (a) a position of a servo head on a disk is computed, (b) an actual position of the servo head in the present computing time is computed, based on the computed position of the servo head and an estimated position of the servo head computed in the preceding computing time, (c) a moving distance of the servo head is computed, based on the actual positions of the servo head computed in the present computing time and in the preceding computing time, (d) an estimated position of the servo head in the present computing time, indicating an estimated position reached by the servo head at the succeeding computing time, is computed from the actual position of the servo head computed in the present computing time to the moving distance of the servo head, (e) a moving velocity of the servo head is computed based on the actual position of the servo head computed in the present computing time and the actual position of the servo head computed in the preceding computing time, (f) a remaining number of tracks up to a target track is computed, based on the actual position of the servo head computed in the present computing time, and (g) an object velocity of the servo head is obtained, based on the remaining number of tracks.

32 Claims, 11 Drawing Sheets

HEAD POSITIONING CONTROL APPARATUS OF DISK DRIVE AND METHOD OF CONTROLLING THE SAME APPARATUS

FIELD OF THE INVENTION

The present invention relates to a head positioning control apparatus of a disk drive and, more specifically, to a circuit for detecting the head position, driving the head in such direction as crossing the tracks on the disk and controlling the positioning operation of the head.

A disk drive to which the present invention will be applied is, for example, a magnetic disk drive which reads servo data recorded on a disk medium. The present invention relates to executed detection of head position and control of driving the head, responsive to servo data obtained by a readout operation.

Magnetic disk drives are increasingly being used as an external data storage apparatus. In one hand, request for large capacity is increased and on the other hand, request for small size, low price and high reliability is enhanced.

DESCRIPTION OF THE RELATED ART

The prior art will be explained with reference to FIG. 1, indicating a block diagram of a conventional head positioning control circuit.

In FIG. 1, the reference numeral 10 denotes a magnetic disk; 11, a servo head; 12, a voice coil motor; 13, a control current detecting circuit; 14, an object velocity generating circuit; 15, a velocity detecting circuit; 16, a velocity error detecting circuit; 17, a position error detecting circuit; 18, a power amplifier; 19, a servo signal detecting circuit; 20, a track crossing pulse generating circuit; 21, a main controller; 22, a selection circuit.

On a magnetic disk 10, servo data required for positioning of a servo head 11 is recorded, in addition to data being recorded. The servo head 11 is used for reading servo data from the magnetic disk 10. A voice coil motor 12 generates the force to move both servo head 11 and a data head crossing the tracks.

A servo signal detecting circuit 19 reads servo head recorded on the magnetic disk 10 with the servo head 11 and generates a position signal indicating the position of servo head 11.

A velocity detecting circuit 15 detects a moving velocity of the servo head 11 from the position signal generated by the servo signal generating circuit 19 and a motor drive current detected by a control current detecting circuit 13.

A velocity error detecting circuit 16 detects velocity error between the object velocity generated, during the coarse control, by an object velocity generating circuit 14 and the moving velocity of servo head 11 detected by the velocity detecting circuit 15, and outputs a voltage responsive to the velocity error.

A position error detecting circuit 17 detects position error from the position signal generated, during the fine control, by the servo signal detecting circuit 19 and a motor drive current detected by the control current detecting circuit 13, and outputs a voltage responsive to position error.

A selection circuit 22 outputs an input from the velocity error detecting circuit 16, during the coarse control (speed control), to a power amplifier 18 with a coarse/fine selection signal from a main controller 21, and also outputs an input from the position error detecting circuit 17, during the fine control (position control), to the power amplifier 18.

The power amplifier 18 converts a signal voltage outputted from the velocity error detecting circuit 16 or position error detecting circuit 17 into a current signal and then outputs such current signal to the voice coil motor 12.

A track crossing pulse generating circuit 20 generates a track crossing pulse which indicates that the servo head 11 has crossed the boundary between the one track and the other track, with the position signal generated by the servo signal detecting circuit 19.

The main controller 21 executes processings, such as setting of the number of tracks crossed until the head reaches the target track, initiation of velocity control, selection to position control from velocity control and detection of a number of the remaining tracks until the target track by counting the track crossing pulse, etc.

When a seek instruction is applied to the main controller 21 from a host apparatus, the main controller 21 instructs a number of remaining tracks up to the target track to the object velocity generating circuit 14. The object velocity generating circuit 14 generates the most suitable object velocity for moving the servo head to the target track.

Moreover, the main controller 21, upon counting of track crossing pulse from the track crossing pulse generating circuit 20 and detection of servo head 11 having reached the target track, transmits the coarse/fine selection signal to the selection circuit 22 for transfer to the position control from velocity control. When the servo head 11 stops at the target track, the seek operation is completed.

The servo system of the conventional magnetic disk drive is constituted by individual circuits. Therefore, reduction in size is restricted, reliability is poor and cost is high.

Particularly, it has been difficult to realize reduction in size of circuits for the track crossing pulse generating circuit required for detecting position of the servo head because many analog elements are used. Moreover, this track crossing pulse generating circuit requires relatively large occupation area in comparison with the other circuits. Accordingly, this track crossing pulse generating circuit prevents the reduction in size of a magnetic disk drive as a whole.

In addition, since the track crossing pulse generating circuit is formed by many analog elements and requires a very expensive comparator which ensures high speed operation, it is difficult to produce a low price magnetic disk drive.

Moreover, since the track crossing pulse generating circuit uses a comparator as explained above, if noise is superposed on an output of the servo signal detecting circuit 19, an erroneous track crossing pulse is generated and the counted value of the number of crossing tracks also becomes erroneous. Thus, the servo head may be positioned to the track different from the target track.

Furthermore, since the track crossing pulse generating circuit is formed by many analog elements such as comparator as explained above, adjustment of circuits becomes troublesome and circuit performance may be deteriorated by the aging effect of analog elements, thereby resulting in a malfunction.

SUMMARY OF THE INVENTION

It is an object of the present invention to provide a small size disk drive, a low price disk drive, and/or a disk drive with improved reliability.

It is another object of the present invention to provide a disk drive including a reduced number of analog elements to be used in the head positioning control circuit of the disk drive.

It is another object of the present invention to provide a method for digitally detecting the position of the head, without using the track crossing pulse generating circuit.

It is still another object of the present invention to provide a method of moving the servo head to the target track position from the current track position by the speed control.

It is a further object of the present invention to provide a novel method of digitally computing the position of a servo head by utilizing a high speed digital arithmetic circuit, and more particularly, to provide a novel method of computing estimated position of the servo head on the occasion of computing the real position of the servo head from the estimated position of serve head and a value of servo signal read by the servo head.

It is a still further object of the present invention to provide a method of computing moving velocity of a servo head required for computing the first servo estimated position under the condition that the real position and estimated position of servo head are unknown, for example, in such a case as immediately after the power switch is turned ON.

It is also an object of the present invention to provide a method of detecting correct position of the servo head by digitally eliminating noise even in case such noise is superposed on the servo signal read by the servo head, on the occasion of computing the real position of the servo head from the estimated position of servo head and a value of the servo signal read by the servo head.

In order to attain the objects, the present invention computes the real position of the servo head by the processes that the servo signal read by the servo head is digitally converted in every predetermined time and the digital arithmetic circuit computes the arithmetic operations based on the digitally converted value.

Accordingly, the present invention is characterized in that moving velocity of the servo head is computed, as a method of computing estimated position of the servo head which is required for computing the real position of the servo head, from the preceding servo head position and the current servo head position and the next estimated position of the servo head is computed from moving velocity of the servo head and the time required for computing the next servo head position.

The present invention is also characterized in that if the real position of the servo head computed from estimated position of the servo head and a value of the digitally converted servo signal deviated, to a considerable extent, from estimated position on which the computation has been executed, it is considered that noise element has ben superposed on the servo signal and the computed position is not used as the real position of the servo head but estimated position of the servo head is used in direct as the real position of the servo head.

The present invention is further characterized in that the servo head is moved at the predetermined velocity by supplying a predetermined drive current to the motor after the power switch of disk drive is turned ON. Under this condition, the period of servo signal read from the servo head is measured and a moving velocity of the servo head can be computed from the period of measured servo signal and the known distance corresponding to the period of this servo signal.

DESCRIPTION OF THE PREFERRED EMBODIMENTS

A head positioning control circuit of the present invention reduces the number of analog elements and unnecessary components of a track crossing pulse generating circuit.

Therefore, a position of the servo head has previously been detected by counting the generated track crossing pulses with the track crossing pulse generating circuit. The present invention discloses a circuit and a method of detecting position of the servo head.

Accordingly, the real position of the servo head is computed by digitally converting the servo signal read by the servo head in every predetermined time and executing the arithmetic processing of the digitally converted value with a digital arithmetic circuit. The digital arithmetic circuit corrects the estimated position of the servo head computed by the arithmetic process on the basis of the digital value of the servo signal read by the servo head and computes the real position of the servo head.

Figure 1:
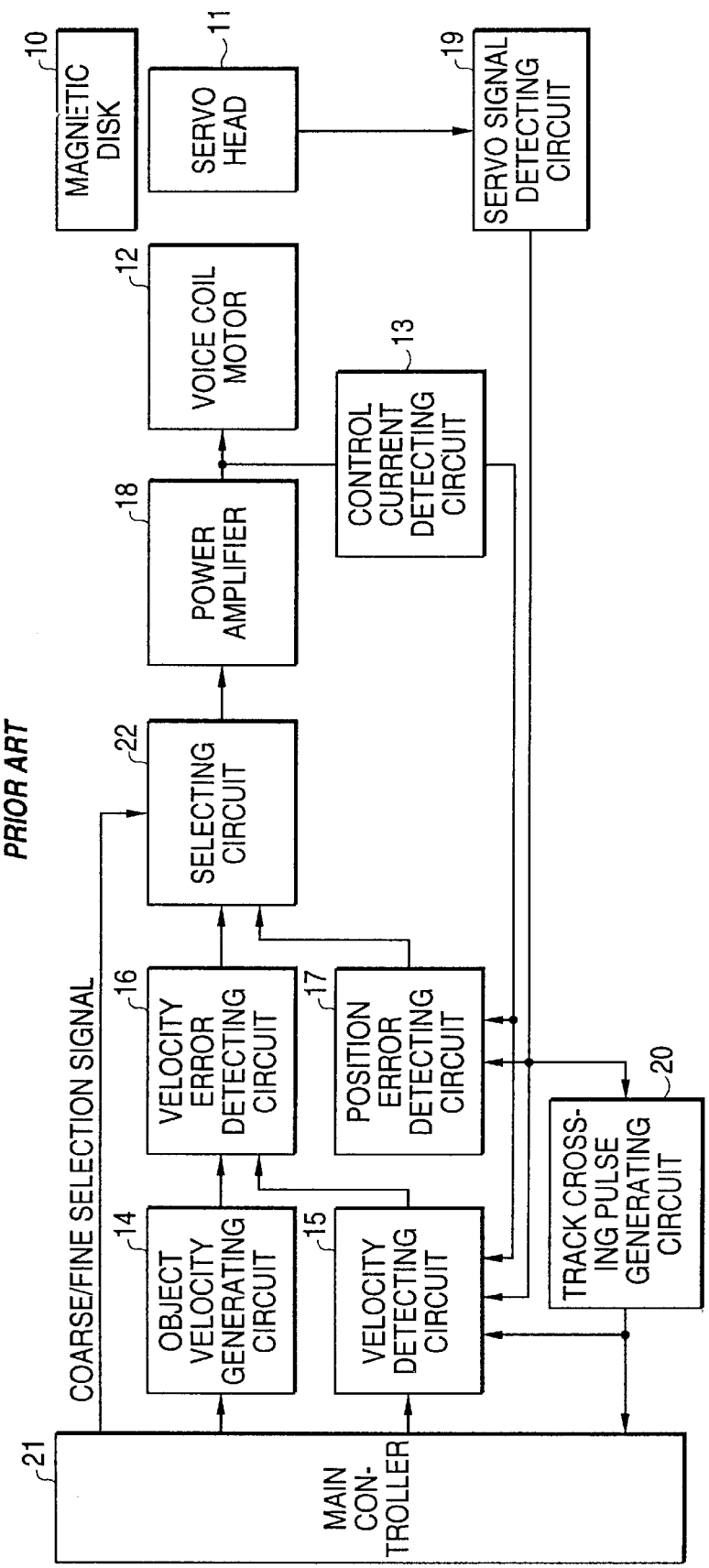
FIG. 1 (prior art) is a block diagram of a conventional head positioning control circuit of a magnetic disk drive.
Figure 2:
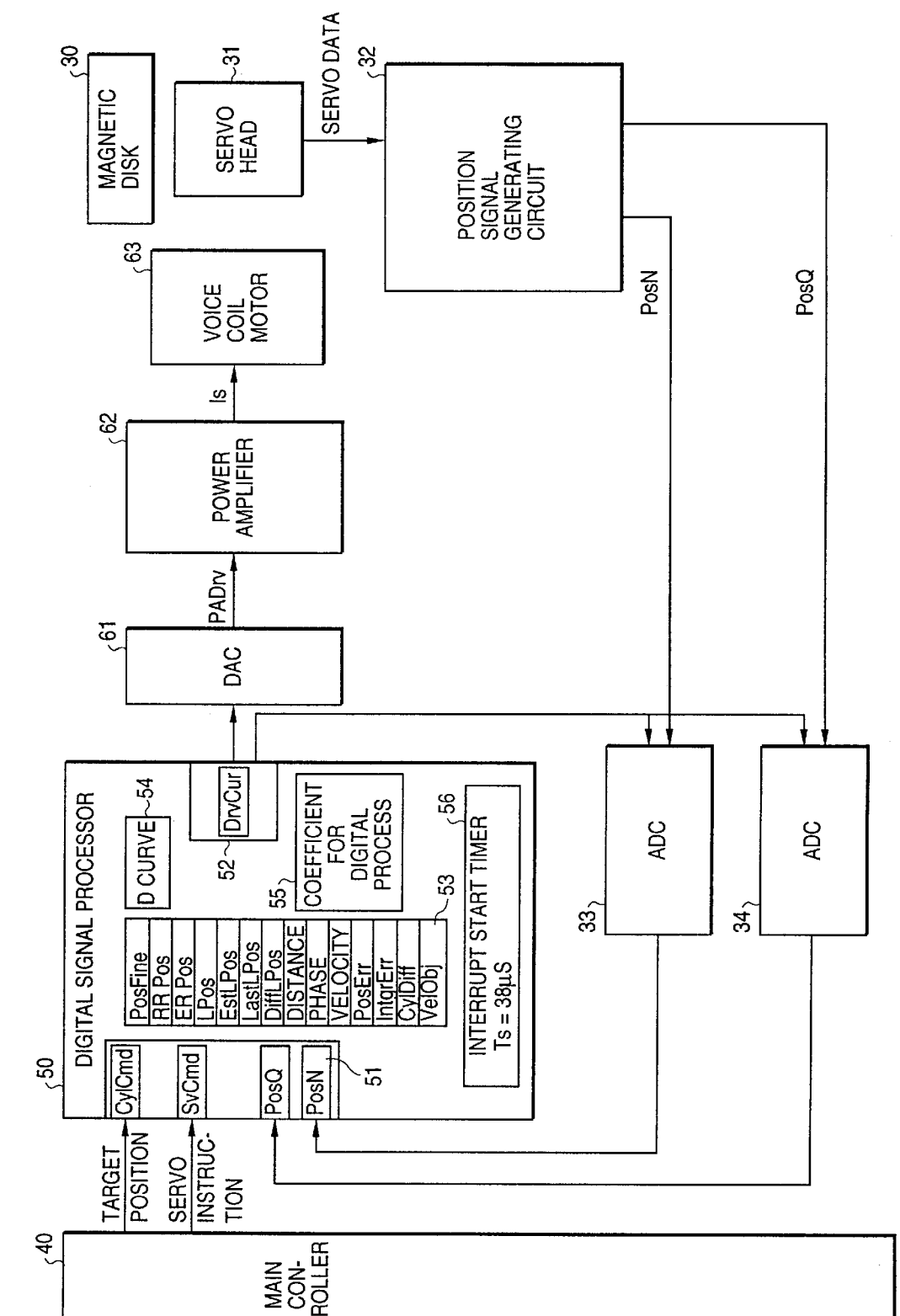
FIG. 2 is a block diagram of a head positioning control circuit of a magnetic disk drive of the present invention.
Figure 3:
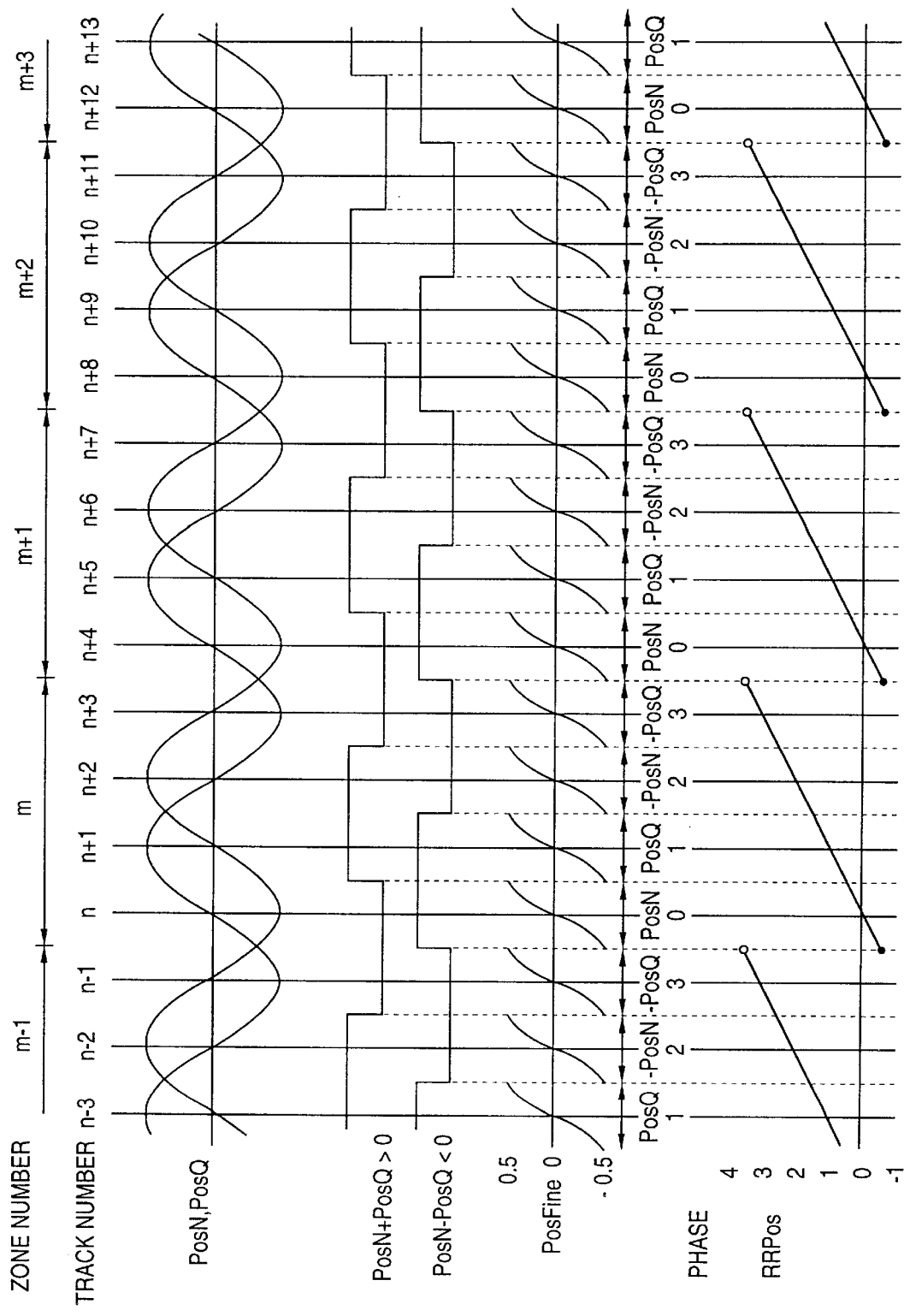
FIG. 3 is a diagram indicating each computed value of a head positioning control circuit of the present invention.
Figure 4:
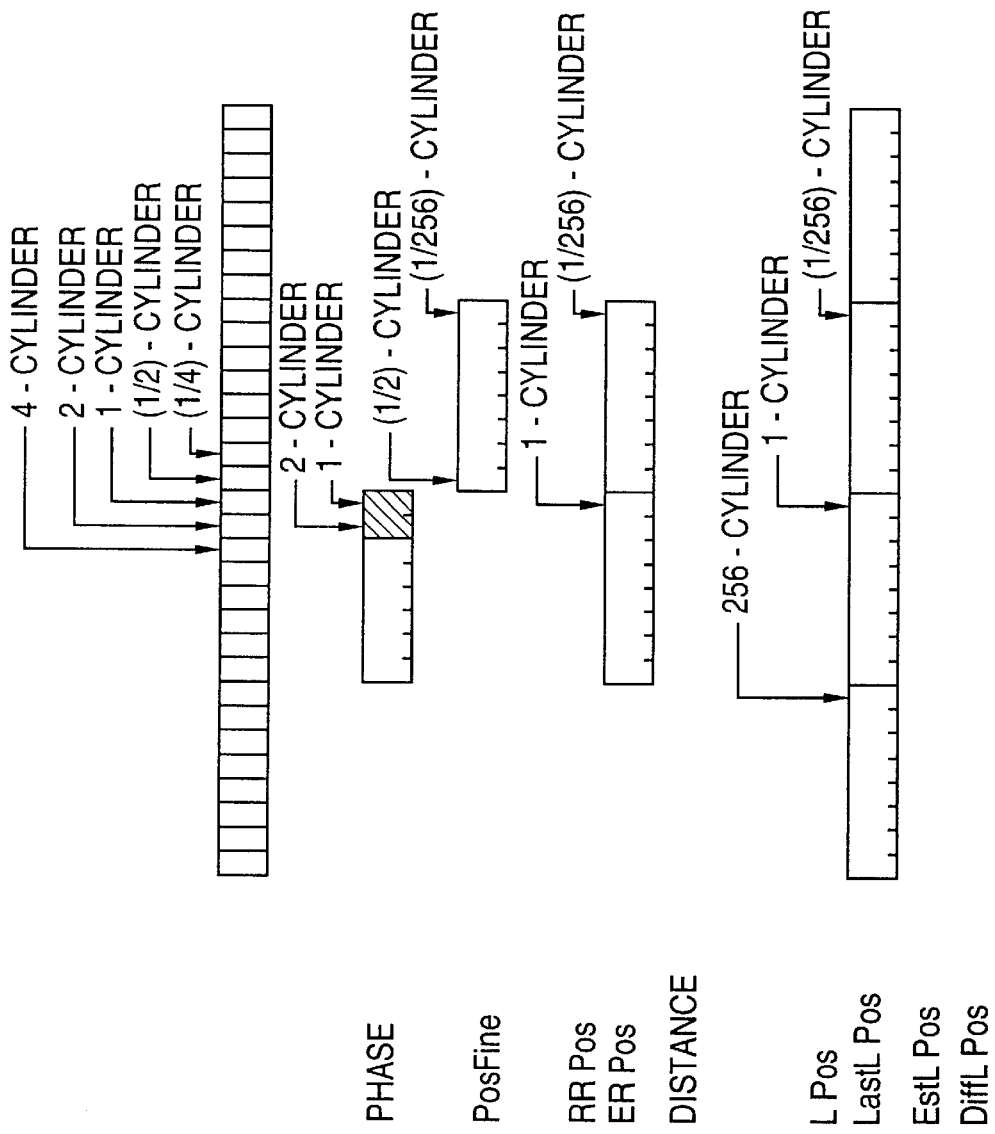
FIG. 4 is a diagram for explaining a data format of each computed value.
Figure 5A:
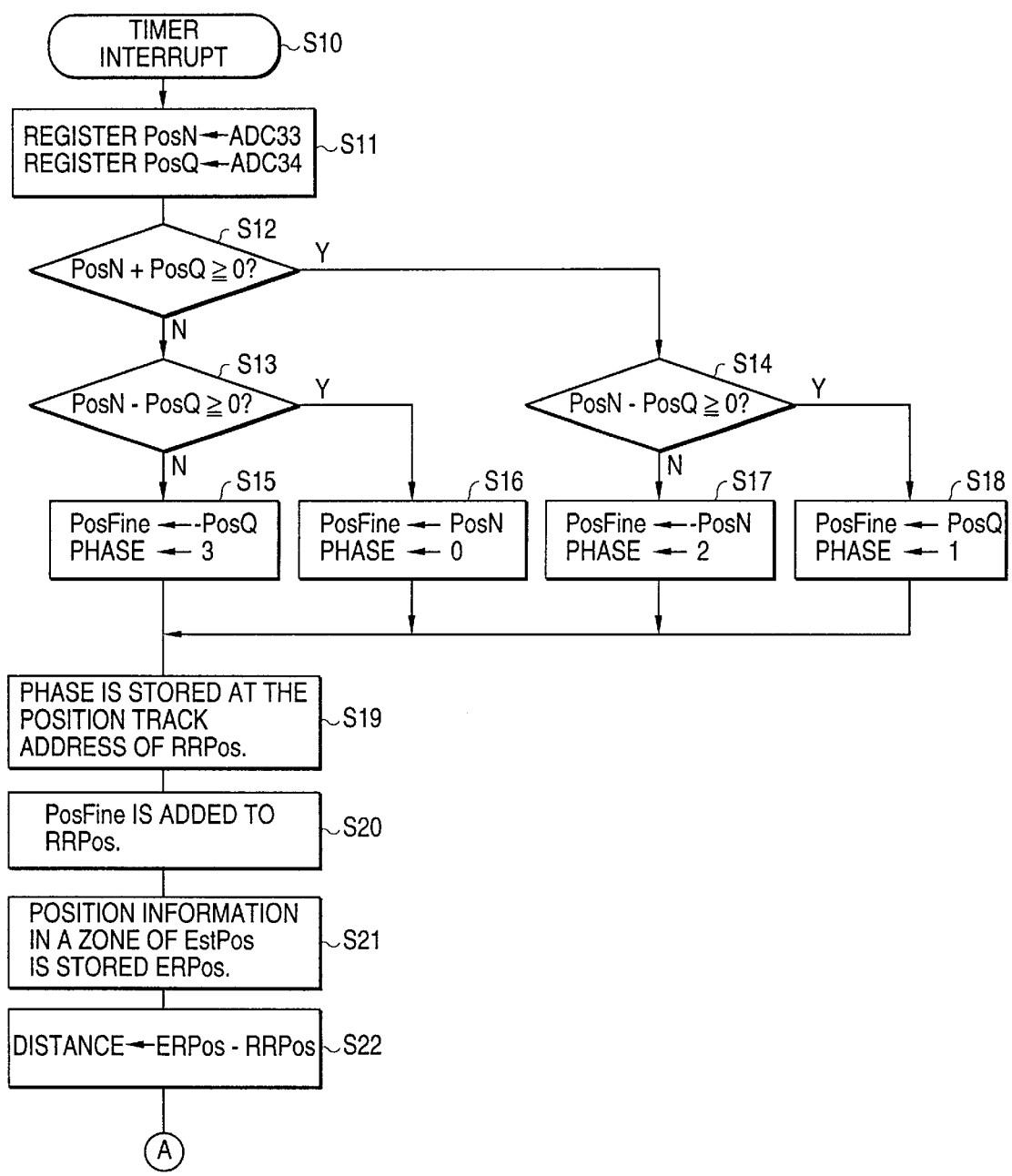
FIG. 5 is a flowchart for explaining operation of a head positioning control circuit.
Figure 5B:
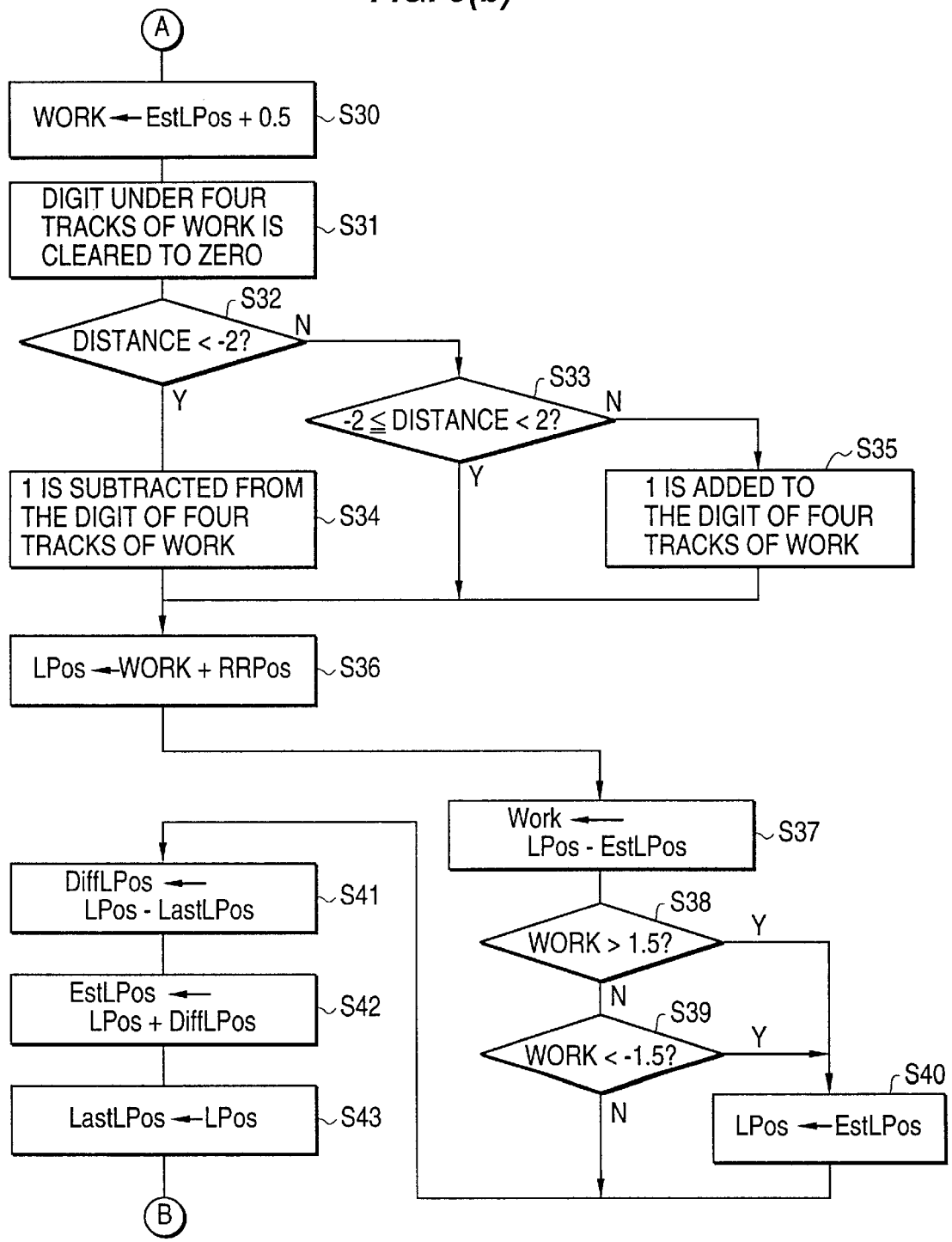
Figure 5C:
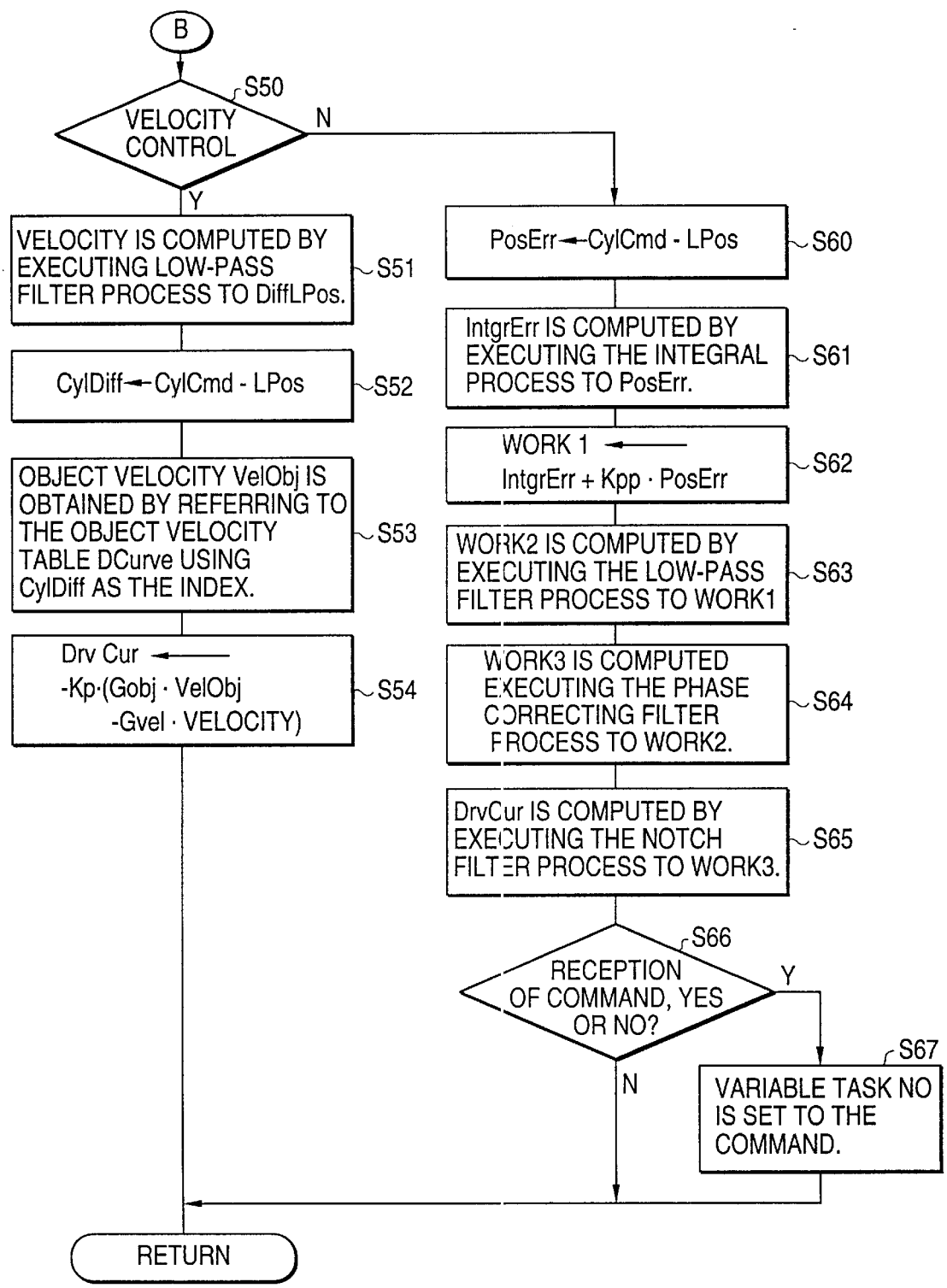
Figure 6:
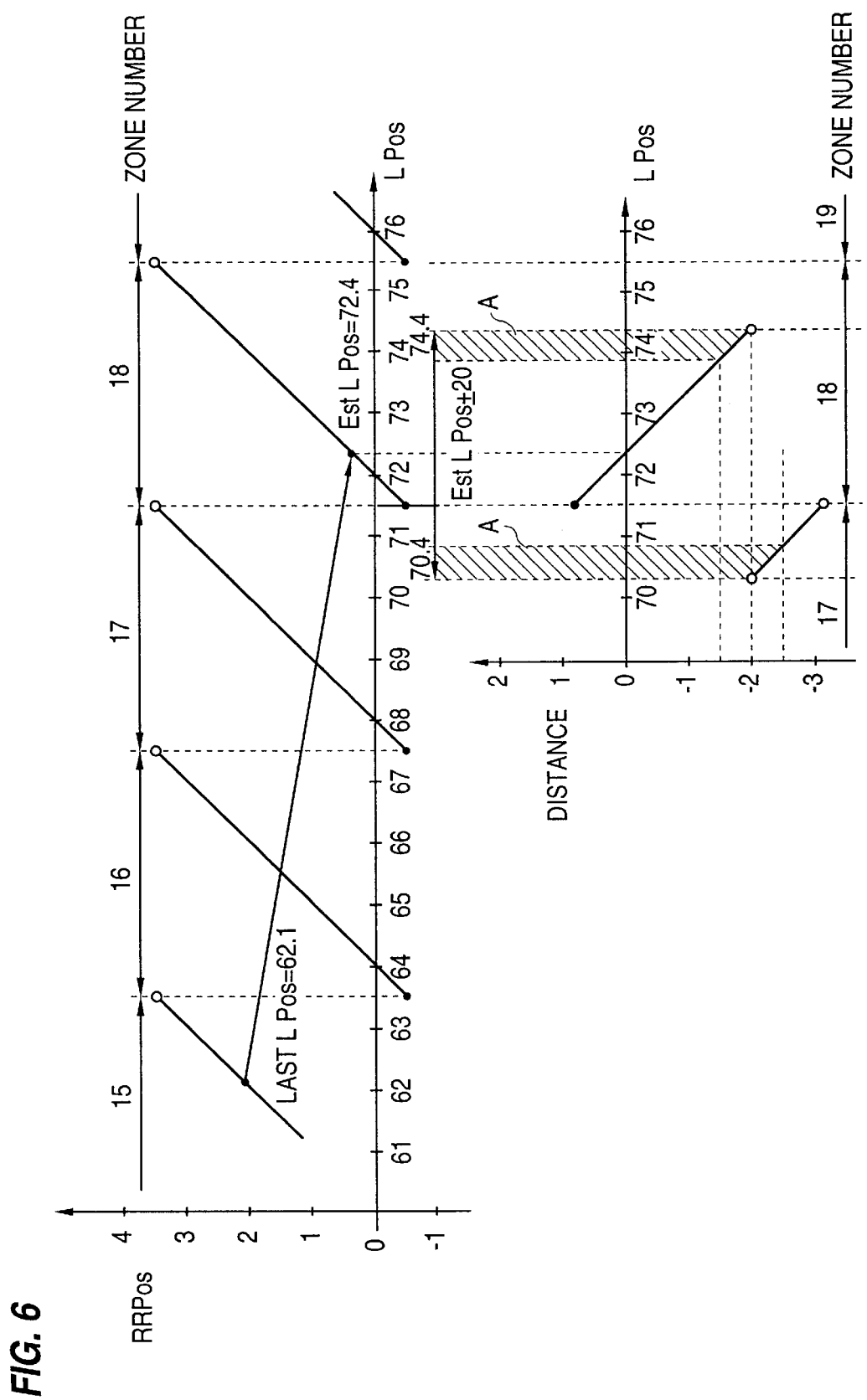
FIG. 6 and FIG. 7 are diagrams indicating each computed value when the head moves.
Figure 7:
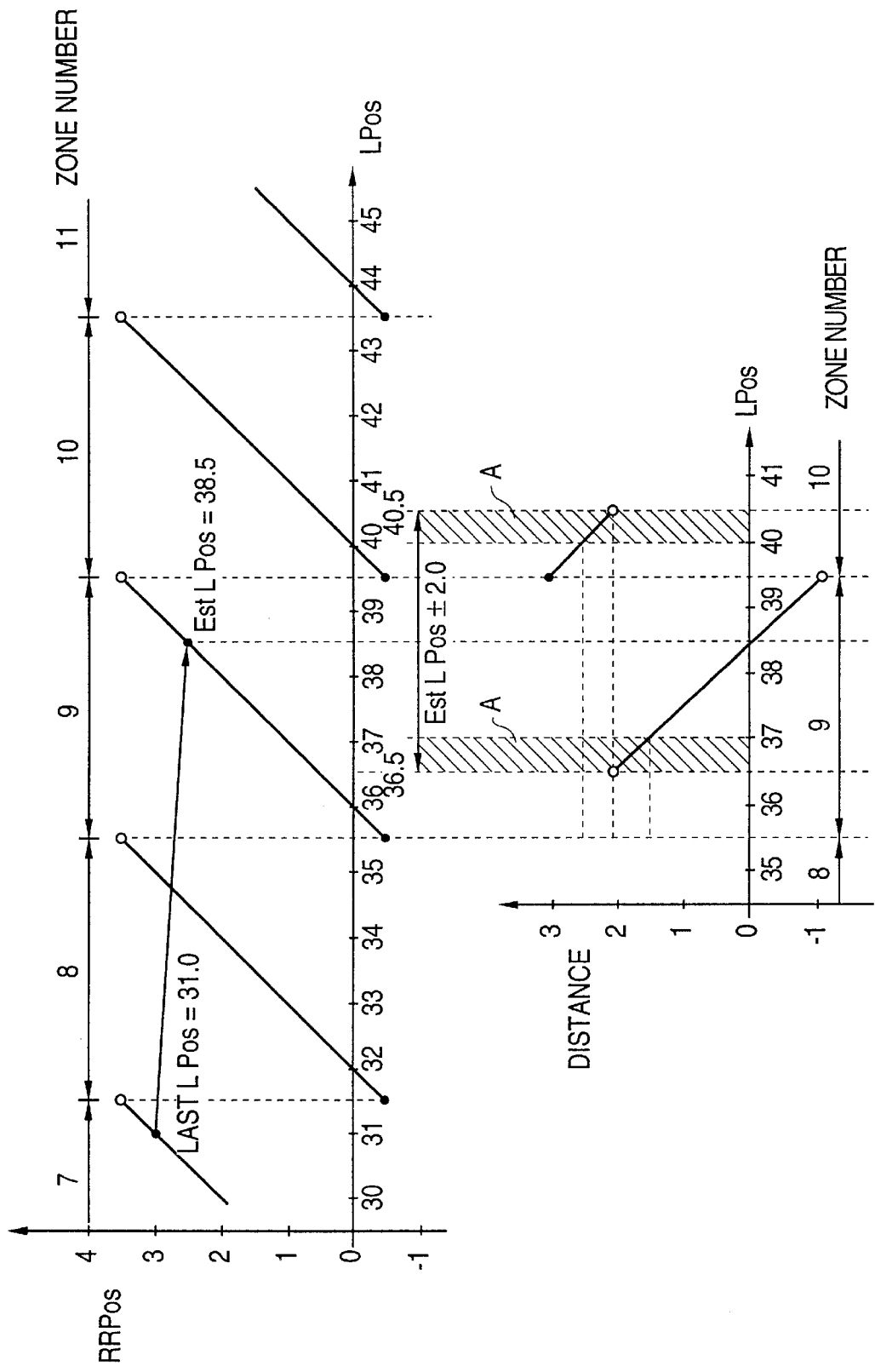
Figure 8:
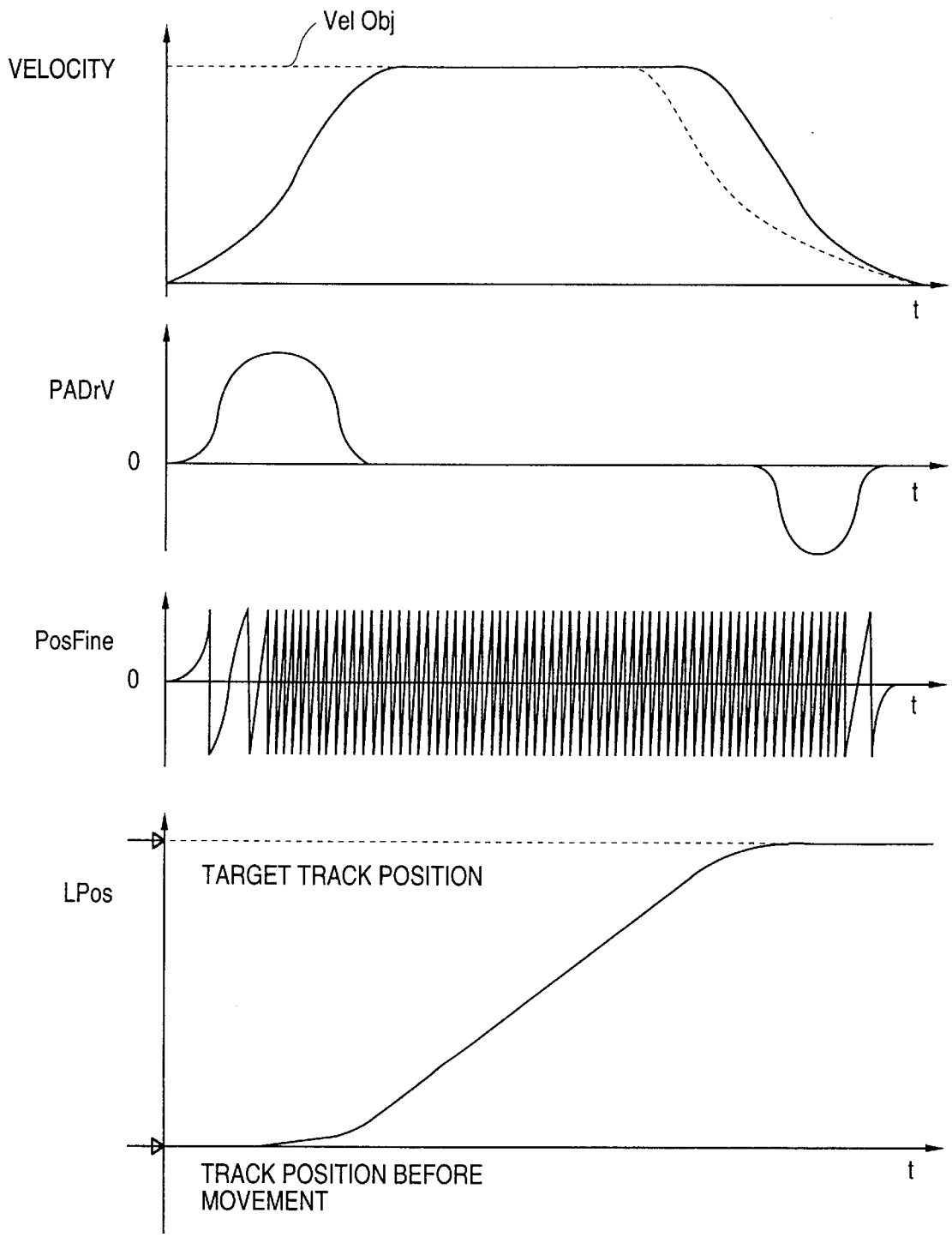
FIG. 8 is a diagram indicating moving velocity of the servo head, a drive current of motor and a position of the servo head during the seek operation mode.
Figure 9:
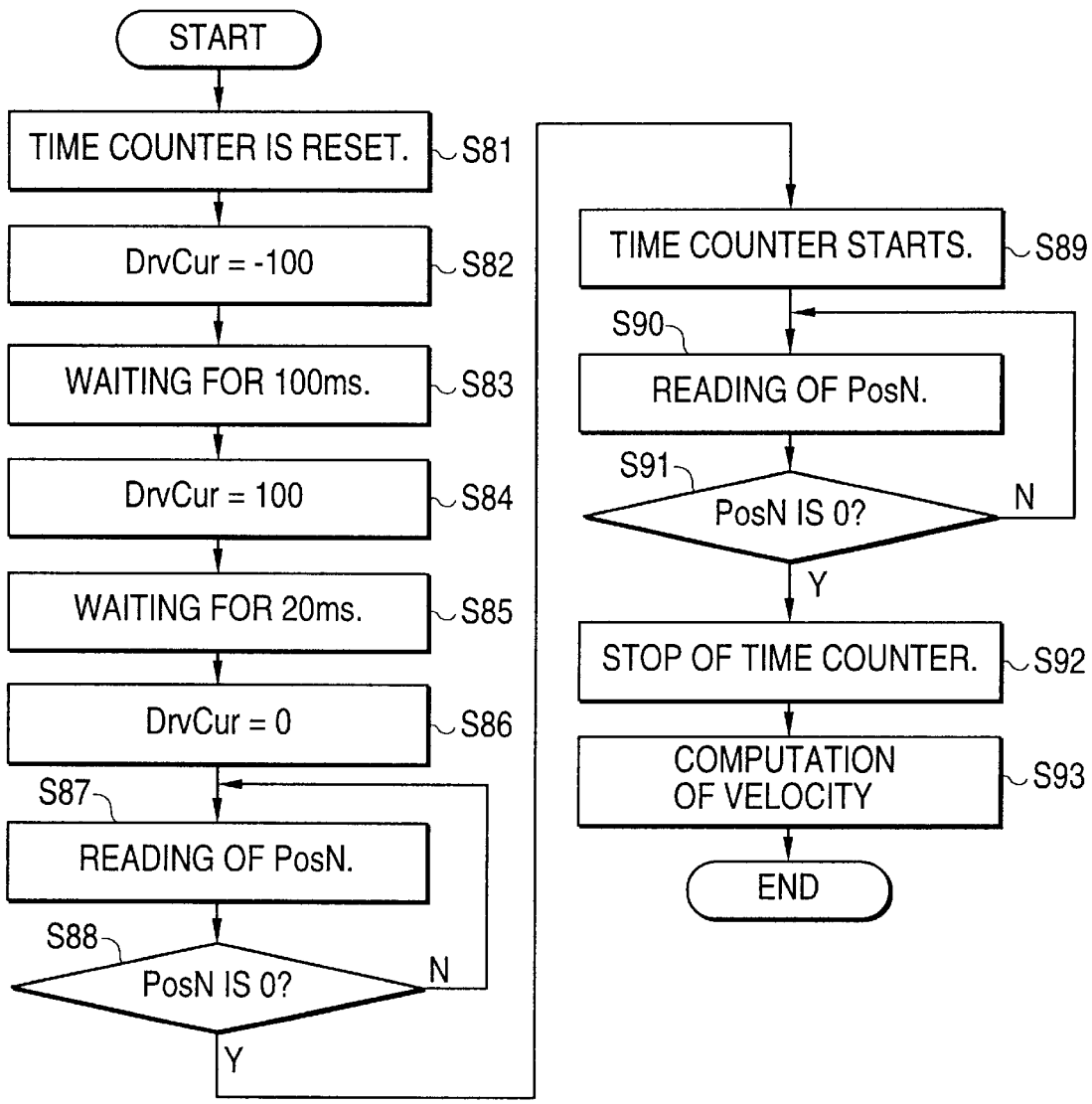
FIG. 9 is a flowchart for explaining a method of computing the initial value of moving velocity of the servo head.

An embodiment of the head positioning control circuit of the present invention will be explained with reference to FIG. 2 to FIG. 9. FIG. 2 is a block diagram of the head positioning control circuit of the present invention. FIG. 3 is a diagram indicating each computed value. FIG. 4 is a diagram for explaining a data format of each computed value. FIG. 5 is a flowchart for explaining operations of the head positioning control circuit. FIG. 6 and FIG. 7 are diagrams indicating each computed value when the head is moving. FIG. 8 is a diagram indicating a moving velocity of the servo head during the seek operation mode, a motor drive current and position of the servo head. FIG. 9 is a flowchart for explaining a method of setting the initial value of moving velocity of the servo head.

I. Explanation about a Composition of Head Positioning Control Circuit

A composition of the head positioning control circuit of the present invention will then be explained with reference to FIG. 2.

In this figure, the numeral 30 denotes a magnetic disk; 31, a servo head; 32, a position signal generating circuit; 33 and 34, an analog digital converter (ADC); 40, a main controller; 50, a digital signal processor (DSP); 61, a digital analog converter (DAC); 62, a power amplifier; 63, a voice coil motor.

As a magnetic disk 30, a plurality of magnetic disk media are rotatably driven by the one spindle motor, the single surface of the one magnetic disk medium is used as the servo plane and well known 2-phase servo patterns, for example, are recorded in each track on such servo plane. Moreover, the plane other than the servo plane is used as the data plane for data recording.

A servo head 31 is used for reading the 2-phase type servo pattern recorded on the servo plane and inputs the servo signal to a position signal generating circuit 32.

The position signal generating circuit 32 generates a position signal which indicates the position of servo head 31 based on the servo signal read by the servo head 31. This position signal is composed of two kinds of signals, PosN and Posd PosQ, having deviation of 90° therebetween. These signals are all analog sine wave signals.

ADC 33 and ADC 34 respectively convert the analog position signals PosN and PosQ generated by the position signal generating circuit 32 into digital signals and then output these signals to DSP 50. Moreover, conversion to digital signal is instructed from DSP 50, explained later.

DSP 50 corrects the estimated position of servo head 31 computed by arithmetic operation on the basis of the digitally converted position signals PosN and PosQ in order to compute the real position of servo head 31. Thereafter, on the occasion of computing the estimated position of servo head 31, the moving velocity of servo head 31 is computed from the preceding servo head position and the current servo head position, and the next servo head position is estimated from the time required for computing the next servo head position and the moving velocity of servo head.

Moreover, DSP 50 computes a current value to be applied to the voice coil motor 63 in order to position the servo head 31 to the desired track on the basis of the difference between the computed moving velocity of servo head 31 and the target velocity responsive to the remaining number of tracks until the target track.

DSP 50 is required to realize high speed arithmetic operation and input or output of data. TMS 320C25 produced by TEXAS INSTRUMENTS is used, for example, as DSP 50.

DSP 50 of the present embodiment comprises an input port 51, an output port 52, RAM 53≈55 for storing coefficients for each digital value and various digital processings, and an interrupt timer 56, etc.

The input port 51 of DSP 50 has registers CylCmd and SvCmd for storing the target track and servo instruction given from the host circuits and registers PosN and PosQ for storing values of digitally converted position signals PosN and PosQ. On the other hand, the output port 52 of DSP has a register DrvCur for storing a motor drive current value computed by arithmetic operation of DSP 50.

RAM of DSP 50 comprises a part 53 for storing each digital value of digitally converted position signal, etc., a part 54 for storing a table DCurve of the object velocity corresponding to a number of remaining tracks and a part 55 for storing coefficients of various digital processings.

DAC 61 executes analog conversion of a motor drive current value stored in the register DrvCur and asynchronously operates with DSP 50 to initiate analog conversion for each renewal of input value and outputs a voltage corresponding to a value of register DrvCur.

A power amplifier 62 converts a voltage outputted from DAC 61 into a current and outputs it to the voice coil motor 63 and also applies a current for driving the voice coil motor 63.

The voice coil motor 63 moves the servo head and data head in the radius direction of magnetic disk 30, namely in such direction as crossing the tracks.

A main controller 40 instructs servo instructions and the target track. Moreover, the main controller 40 executes interface control between host controllers and monitoring of rotation control of magnetic disk 30.

II. Explanation about Each Computed Value in Circuit

Each computed value required for explaining operations of the circuit will be explained with reference to FIG. 3. FIG. 3 is a diagram for explaining each computed value of the head positioning control circuit of the present embodiment. In FIG. 3, each computed value is indicated, for the convenience of explanation, as a continuous analog signal, but in actual, it is a digital value converted in the predetermined time interval or a digital value computed by DSP 50. However, PosN and PosQ are analog signals.

Moreover, in FIG. 3, a vertical solid line indicates the boundary between servo tracks, suggesting that when any one of the digitally converted position signals PosN and PosQ is zero, the servo head is located at the boundary between servo tracks. In case the servo head is located at the boundary of servo tracks, the data head which moves interlocking with the servo head is located at the center of data track (on-track condition).

A track number is given continuously to each track. For example, when the total number of tracks is 2048, the track number is given from 0 to 2047.

A zone number is also continuously given in unit of four tracks. For example, when the number of tracks is 2048, the zone number is given from 0 to 511. As explained above, the zone number is given in unit of four tracks because the position signals PosN and PosQ are obtained with the four tracks considered as the one period. Namely, when the servo head is relatively located in the same position in any zone, the digitally converted position signals PosN and PosQ have the same value even when the servo head is located in any zone.

PosN and PosQ are analog signals indicating the position of servo head and the signal waveforms can be obtained as shown in FIG. 3, in accordance with the position of servo head. These position signals PosN and PosQ are generated by the position signal generating circuit 32 based on the servo data read by the servo head 31. These signals are then digitally converted by ADC 33 and ADC 34 and are fetched into the registers PosN and PosQ in the DSP 50.

These position signals PosN and PosQ provide deviation of Phase of 90° therebetween in order to discriminate moving direction of the servo head 31 and moreover, if any one of the position signals PosN and PosQ is zero, it indicates that the servo head 31 is located at the boundary between servo tracks.

Moreover, the position signals PosN and PosQ are repeated periodically in every four tracks, namely in every zone. Therefore, the position signals PosN and PosQ provide relative positional information in the zone but does not include the zone information to be detected.

Phase indicates a track number in the zone in which the servo head is located and takes any value amount 0, 1, 2, 3. This Phase can be obtained based on arithmetic operation and comparison of PosN+PosQ>0 and PosN−PosQ>0 as will be explained later.

PosFine indicates a precise positional information of the servo head in a track. That is, the one track is divided into 256 sections and a value which is −0.5 or larger but under 0.5 is indicated in unit of 1/256. PosFine takes any one value, based on the value of Phase, among PosN, PosQ, −PosN and −PosQ. A method of obtaining PosFine will be explained later but PosFine extracts the linear part of the position signal PosN or PosQ as shown in FIG. 3 and obtains a value thereof through arithmetic operation with gradient in the same direction.

RRPos indicates an actually measured positional information of servo head in a certain zone and a value which is −0.5 or larger but under 3.5 is indicated in unit of 1/256. This RRPos can be obtained by adding a track number Phase in a zone and a positional information PosFine in a track. Moreover, a value of actually measured RRPos within a zone becomes incontinuous as shown in FIG. 3 but this incontinuous point corresponds to the boundary of zone.

III. Explanation about Data Format of Each Computed Value

Thereafter, a data format of each computed value to be processed within DSP 50 will be explained with reference to FIG. 4. Each computed value is stored in RAM 53 within DSP 50 and in a register and each computed value has any one data length amount 1-byte, 2-byte and 4-byte.

The upper most figure of FIG. 4 indicates the maximum data length to be processed within DSP 50. A data corresponding to track number is stored within the upper two bytes. For instance, when a number of tracks of 2048, a value in the range from 0 to 2047 is stored. Here, the lowest bit of the upper two bytes indicates a digit of 1 of binary number, while the second lowest bit indicates a digit of 2 of binary number.

Meanwhile, a positional information in the track is stored in the lower two bytes, that is, a value under 1 is stored therein. Here, the highest bit of lower two bytes indicates a digit of ½ of a binary number, while the second highest bit indicates a digit of ¼ of a binary number.

In FIG. 4, each computed value has any one data length amount 1-byte, 2-byte and 4-byte and the digit of each bit of each computed value is aligned in vertical direction for the convenience of explanation.

In succession, each computed value to be processed in DSP 50 will be explained hereunder.

1) Phase: Indicates a track number within a zone where the servo head is located. This value is formed by one byte and takes a digital value indicating any one of 0, 1, 2 and 3.

2) PosFine: Indicates a precise positional information within a certain track of the servo head. This value is formed by one byte and takes a digital value in the range from −128/256 to +127/256 in unit of 1/256 by diving the one track into 1/256. For instance, when the servo head is located at the position deviated by 0.25 track toward the track number 6 from the track number 5, PosFine=0.25. Moreover, when the servo head is located at the center between the track number 5 and track number 6, PosFine=−0.5.

3) RRPos: Indicates an actually measured positional information in a zone of the servo head. This value is formed by track number Phase within a zone and positional information PosFine within a track. This value is formed by two bytes and can be computed by adding the positional information PosFine within a track to the upper bytes and adding the positional information PosFine within a track to the lower bytes. This value takes a value in the range from 0.5 or higher but under 3.5. For instance, when the servo head is located at the position deviated by 0.25 track toward the track number 6 from the track number 5, RRPos=5. Moreover, when the head is located at the center between the track number 5 and track number 6, RRPos=5.5.

4) ERPos: Indicates an estimated positional information in a zone of the servo head. This value means the positional information of the digit under four tracks of an estimated absolute position EstLPos explained later and zero is stored for all digits of four tracks or more. This value is formed by two bytes and takes a value similar to the actually measured position RPPos in a zone.

5) Distance: Indicates a positional error which is equal to a difference between estimated position ERPos in a zone of the servo head and an actually measured position RRPos in a zone of the servo head. This value is formed by two bytes and takes a value which is larger than −4.0 but under 4.0.

6) LPos: Indicates an actual absolute position of the servo head. This value is formed by four bytes. The upper two bytes correspond to a track number, while the lower two bytes indicates a precise positional information in a track. However, an actual absolute position LPos is not an actually measured value but is a value obtained by correcting an estimated absolute position EstLPos explained later based on an actually measured position RRPos in a zone. Moreover, the actual absolute position of the servo head LPos takes a value, for example, which is −0.5 or higher but under 2047.5, when a number of tracks is 2048.

7) LastLPos: Indicates an actual absolute position of the servo head during the preceding interrupt processing. This value is formed by four bytes like the actual absolute position LPos of the servo head explained before and takes a value in the similar range.

8) EstLPos: Indicates an estimated absolute position of the servo head. This value is formed by four bytes like a real absolute position LPos and takes a similar value. This estimated absolute position EstLPos can be obtained by computing moving velocity of the servo head from the preceding real absolute position LastLPos and the current real absolute position LPos and by executing the computation based on such moving velocity and the time required until the preceding interrupt processing. The computed estimated absolute position EstLPos is used, during the next interrupt processing, for computing the next real absolute position of the servo head.

9) DiffLPos: Indicates a difference between the current real absolute position of the servo head and the preceding real absolute position and also a moving distance of the servo head from the preceding position.

10) Velocity: Indicates a moving velocity of the servo head computed from moving distance DiffLPos of the servo head.

11) VelObj: Indicates an object moving velocity of the servo head. This VelObj value corresponds to the remaining number of tracks up to the target track and can be obtained by referring to a velocity table DCurve stored in a RAM 54 in DSP 50.

23) ClyDiff: Indicates a number of remaining tracks up to the target track. This number of remaining tracks ClyDiff can be obtained from difference between the real absolute position LPos and the target track number ClyCmd.

13) TaskNo: Indicates condition of servo control. This value is not computed by DSP 50 but is used in some cases as a flag being set by DSP 50. This value will therefore be explained here. The basic control condition includes velocity control, position control and rezero control, etc.

The values stored in a RAM 53 of DSP 50 have been explained above and registers in the input port 51 and output port 52 are also explained hereunder.

14) ClyCmd: Indicates a track number of the target track indicated from the host controller. This value is formed by two bytes and takes, for example, a value from 0 to 2047 in case the number of tracks is 2048.

15) SvCmd: A servo instruction instructed from the main controller 40 is stored. This value is formed by two bytes.
16) PosN: A value obtained by digitally converting the position signal PosN generated by the position signal generating circuit 32 is stored.
17) PosQ: A value obtained by digitally converting the position signal PosQ generated by the position signal generating circuit 32 is stored.
18) DrvCur: A drive current value of the voice coil motor 63 computed by DSP 50 is stored.

IV. Explanation about Operation of the Present Embodiment

Operation of the head position control circuit of this embodiment will be explained with reference to FIGS. 5(a)≈(c), indicating flowcharts for explaining the processes by DSP 50. For velocity control and position control, DSP 50 executes the processes in accordance with the flowcharts shown in FIGS. 5(a)≈(c). The processes executed for the velocity control and position control are partly common. After completion of the common processes, DSP 50 discriminates the velocity control or position control and branches the process for the velocity control or position control (Step S10)

DSP 50 executes the processes explained later with an interval of 38 us preset to an interrupt timer 56. During the period from completion of this interrupt process to initiation of the next interrupt process, DSP 50 discriminates whether the computed head velocity and head position satisfy the transfer condition to the position control from the velocity control, or whether a command is received from the main controller 40 or not.

A setting value 38 us of the interrupt timer 56 is preset so that the single interrupt processing in this embodiment is completed within a time shorter than 38 us and the processes other than the interrupt process can be done sufficiently. Moreover, although detail explanation will be made later, on the occasion of computing the real absolute position LPos by correcting an estimated absolute position EstLPos of the servo head based on the actually measured position RRPos in a zone, a value of the computed real absolute position LPos is not guaranteed if an estimated error between the estimated absolute position EstLPos and actual absolute position of the servo head (not computed real absolute position LPos) is not within ±2 tracks. Therefore, the interrupt timer 56 is set so that the estimated error is within ±2 tracks.

(Step S11)

DSP 50 instructs initiation of analog-digital conversion to ADC 33 and 34 and stores digitally converted values of position signals PosN and PosQ in the registers PosN and PosQ in the input port 51.

(Steps S12≈S18)

DSP 50 discriminates amplitudes of PosN and PosQ in four kinds in the steps S12≈S18 and executes the processings explained later, responsive to the result of discrimination in order to compute the track number Phase and positional information PosFine in the track in the zone where the servo head is locates.

1) When the conditions PosN+PosQ<0 and PosN−PosQ<0 are satisfied, the positional information in the track PosFine is defined as −PosQ and track number in the zone Phase as 3 in the step S15.

2) When the conditions PosN+PosQ<0 and PosN−PosQ<0 are satisfied, the positional information in the track PosFine is defined as PosN and the track number in the zone Phase as 0 in the step S16.

3) When the conditions PosN+PosQ≧0 and PosN−PosQ<0 are satisfied, the positional information in the track PosFine is defined as PosN and the track number in the zone Phase as 1.

4) When the conditions PosN+PosQ≧and PosN−PosQ<0 are satisfied, the positional information in the track PosFine is defined as −PosN and the track number in the zone Phase as 2.

(Step S19)

DSP 50 computes the actually measured position in the zone of the servo head from the track number in the zone Phase and positional information in the zone PosFine and sets the obtained value to a variable RRPos in the steps S19 and S20. In the step S19, the track number in the zone Phase is stored to the digit of one track or more of the variable RRPos. In this timing, the variable RRPos takes any one value among 0, 1, 2 and 3.

(Step S20)

DSP 50 adds the positional information in the track PosFine to the positional information under one track of the variable RRPos. Therefore, positional information in the zone RRPos takes a value of −0.5 or larger but under 3.5.

(Step S21)

DSP 50 extracts a part of the estimated absolute position EstLPos corresponding to the positional information in the zone and stores an estimated position in the zone to the variable ERPos. This estimated position in the zone ERPos takes a value of −0.5 or higher but under 3.5 like the actually measures position in the zone RRPos.

(Step S22)

DSP 50 computes a positional error by subtracting the actually measured position in the zone RRPos from the estimated position in the zone ERPos and stores such error in the variable Distance. A positional error Distance takes a value of −4.0 or higher but under 4.0.

(Step S30≈S31)

DSP 50 extracts, in the steps S30≈S31, a part corresponding to the zone number of the estimated absolute position EstLPos and stores this part in the variable Work for job. First, in the step D30, 0.5 is added to the estimated absolute position EstLPos and the result is stored in the variable Work for job, because the starting point for giving the zone number is deviated by 0.5 track from the starting point of the absolute position, a quotient of 4 of the absolute position does not simply become a zone number and a quotient of 4 of the result of adding 0.5 to the absolute position becomes an accurate zone number. In succession, in the step S21, a digit under four tracks of the variable Work for job is cleared to zero. In this timing, a part corresponding to the zone number of the estimated absolute position EstLPos is stored in the variable work.

(Steps S32≈S36)

DSP 50 corrects, in the steps S32≈S36, the estimated absolute position EstLPos with the actually measured position in the zone RRPos and executes the process for obtaining the real absolute position RRPos. In this case, it is necessary as a precondition that an error between the estimated absolute position EstLPos and the real position should be within ±2.0 tracks. It is because the actually measured position RRPos is periodically repeated in every zone and DSP 50 is capable of recognizing the position in the zone from this actually measured position RRPos in the zone but cannot recognize the zone number.

Therefore, the zone number of actual position is the same as the zone number of the estimated total position EstLPos or increased or decreased under the precondition that an error between the estimated absolute position EstLPos and the actual position is within ±2.0. This discrimination is executed depending on the value of positional error Distance which is a difference between the absolute position in the zone ERPos and actually measured position in the zone RRPos and the processings described later are also executed responsive to the discrimination are also executed.

1) When positional error Distance is under −2.0, 1 is subtracted from the digit of four tracks of variable Work for decrement of 1 of zone number in the step S34. The digit higher than four tracks of variable Work corresponds to the zone number.

2) When positional error Distance is −2 or higher but under 2, the variable Work is constant and the zone number does not change.

3) When positional error Distance is larger than 2, 1 is added to the digit of four tracks of variable Work to increment of 1 of the zone number in the step S35.

(Step S36)

The zone number of real position is stored in current in the variable Work for job. The real absolute position LPos of the servo head is computed by adding the actually measured position in the zone RRPos to this variable for job Work.

(Steps S37≈S40)

DSP 50 eliminates noise in the stage of analog signal before digital conversion of the positional signals PosN and PosQ and executes the process for improving stability of servo control in the steps S37≈S40. First, in the step S37, a positional error which is a difference between the real absolute position LPos and estimated absolute position EstLPos is stored in the variable for job Work in the step S37.

Thereafter, DSP 50 judges, when a value of the variable Work indicating a positional error is larger than 1.5 or under −1.5, that noise is superposed on the servo signal which has been used basically for obtaining the actually measured position in the zone RRPos. In this case, DSP 50 uses, in the step S40, the estimated absolute position EstLPos itself as the real absolute position LPos and does not use it as the real absolute position LPos computed based on the actually measured position in the zone RRPos.

On the other hand, if a value of variable Work which indicates a positional error takes a value other than that indicated above, the actually measured position in the zone RRPos is decided accurate and the real absolute position LPos computed from the actually measured position in the zone RRPos is used in direct. When positional error is larger than 1.5 or under −1.5, DSP 50 judges that noise is superposed on the servo signal, but such positional error is not always required to be limited to such value, 1.4.

(Step S41)

DSP 50 subtracts the preceding real absolute position LastLPos from the actually measured position LPos to compute a moving distance DiffLPos of the servo head.

(Step S42)

DSP 50 computes the next estimated absolute position Est of the servo head as preparation for the next interrupt process. Computation of this estimated absolute position EstLPos is executed, in this embodiment, by adding the moving distance of head DiffLPos to the current real absolute position LPos. This is the most simplified position. If it is assumed that moving velocity of the servo head is unchanged, since the interrupt time is a constant interval, the next estimated absolute position EstLPos of the servo head can be computed only by adding computed moving distance DiffLPos of the servo head to the real absolute position LPos of the servo head.

Moreover, it is not required to limit the interrupt time to a constant interval in the next interrupt process may also be computed from moving velocity of the servo head and the time until the next interrupt process. In addition, an estimated position of the servo head may also be computed in the next interrupt process by considering not only moving velocity of the servo head but also acceleration of the servo head. Moreover, an estimated position may be computed by considering velocity of the servo head.

(Step S43)

DSP 50 defines the real absolute position LPos as the preceding real absolute position LastLPos as the preparation for the next interrupt process.

(Step S50)

DSP 50 decides to execute velocity control or positional control. In practical, the current servo control condition is set to a variable TaskNo and it is decided to execute the velocity control or positional control by referring to a value of the variable TaskNo. Setting of this variable TaskNo is made by DSP 50 in the background process other than the interrupt process or in the step S67 explained later.

(Step S51)

DSP 50 executes, when the velocity control is judged in the step S50, the computation for velocity control in the steps S51≈S54. First, in the step S51, a low-pass filter process is executed to a positional error DiffLPos to compute a head velocity. The low-pass filter process is conducted through digital arithmetic to eliminate higher frequency element. That is, although it may be possible to use in direct a positional error DiffLPos as the head velocity, but the servo control may become unstable due to the higher frequency element and therefore the higher frequency element is eliminated to stabilize servo control by executing the low-pass filter process to the positional error DiffLPos.

(Step S52)

DSP 50 subtracts the real absolute position LPos from a target track number CylCmd to compute the remaining tracks up to the target track CylDiff.

(Step S53)

DSP 50 obtains the object velocity VelObj by referring to an object velocity table DCurve using the remaining tracks up to the target track CylDiff as the index.

(Step S54)

A current value for driving a voice coil motor 63 is computed from the real velocity of head velocity computed in the step S51 and the object velocity VelObj obtained in the step S53 and it is then stored in the register DurCur within the output port of DSP 50. The motor drive current DrvCur is computed by the following equation.

$$DrvCur = -K_p * (G_{obj} * VelObj - G_{vel} * Velciey)$$

Where, $K_p$, $G_{vel}$, $G_{obj}$ are coefficients.

The motor drive current value stored in the register is outputted to DAC 61, which outputs a voltage responsive to an input value to a power amplifier 62 after digital conversion of such input value. The power amplifier 62 outputs a current responsive to such voltage to the voice coil motor 63 to drive it.

V. Explanation about Positional Control

Thereafter, positional control will be explained. DSP 50 ranches to the step S60 when the positional control is judged in the step S50 and executes the positional control process of the steps S60≈S67.

(Step S60)

DSP 50 subtracts the real absolute position LPos from the target track position CylCmd to compute positional error of the servo head PosErr.

(Step S61)

DSP 50 computes IntgrErr by executing the integral process to positional error PosErr. This integral process is executed for correcting a loop gain of the lower frequency range to absorb steady deviation of control error.
(Step S62)

DSP 50 adds IntgrErr and $K_{pp}$*PosErr and stores a result to the variable for job Work1. $K_{pp}$ is a preset coefficient.
(Step S63)

DSP 50 executes the low-pass filter process to Work1 and computes Work2. This low-pass filter process is executed for eliminating higher frequency element to stabilize the servo control.
(Step S64)

DSP 50 executes phase correcting filter process to Work2 to compute Work3. This phase correcting filter process is executed for correcting delay or lead of phase due to difference of frequency bands.
(Step S65)

DSP 50 executes notch filter process to Work3 to compute a motor drive current value DrvCur. This notch filter process is executed for preventing vibration of the servo head due to oscillation of the motor drive current.
(Step S66)

DSP 50 judges whether a servo command is received or not by making reference to the register SvCmd of the input port 51. If the servo command is not received, a series of interrupt process are completed in the step S70 and DSP 50 returns to the background process.
(Step 67)

In case DSP 50 has received the servo command, it DSP 50 sets a variable TaskNo which indicates the servo control condition. Thereafter, DSP 50 returns to the background process in the step S70.

The processes in the steps S66 and S67 may be executed by the background process of DSP 50. But, since the background process is always suspended by the interrupt process, reception of servo command is confirmed in the last stage of positional control because it is not guaranteed that reception of the servo command is always confirmed between the interrupt processes.

In the conventional positional control, the process corresponding to the steps S60≈S65 is executed in the analog circuits, but the present invention executes such processes with a digital signal processor. Since the velocity control is executed by the digital signal processor in the present invention, the positional control may also be executed by the digital signal processor.

VII. Explanation about Each Computed Value while Moving of Servo Head

With reference to FIG. 6 and FIG. 7, detail processes of DSP 50 during the velocity control will be explained.

In these figures, the absolute position of the servo head is plotted on the horizontal axis, while the actually measured position in the zone RRPos and positional error Distance are plotted on the vertical axis. The figures in the upper stage show the actually measured position in the zone RRPos for the absolute position of the servo head, while the figures in the lower stage show positional error Distance which is a difference between the estimated position ERPos in the zone and actually measured position in the zone RRPos for the absolute position of the servo head.

An example of FIG. 6 indicates the real absolute position in the preceding interrupt process of 62.1 and estimated absolute position of 72.4. The estimated position in the zone ERPos is 0.4, the zone number is 18 and track number in the zone is 0.

The figure of lower stage in FIG. 5 indicates positional error Distance for the absolute position of the servo head in case the estimated position in the zone ERPos is set to 0.4. This positional error Distance becomes incontinuous at the boundary of zones because the actually measured position in the zone RRPos becomes incontinuous at the boundary of zones. When the estimated absolute position and the actually measured position are in the same zone, the positional error Distance is within ±2.0. Moreover when the zone number is decreased, the positional error Distance becomes a value smaller than −2.0.

Therefore, when a positional error Distance is within ±2.0, the zone number of estimated absolute position is equal to the zone number of the real position, positional information corresponding to the zone number of estimated absolute position is extracted and the real absolute position can be computed by adding the actually measured position in the zone RRPos to such positional information.

Meanwhile, when a positional error Distance is smaller than −2.0, the zone number of real position is smaller than the zone number of estimated absolute position, positional information corresponding to the zone number of estimated absolute position is extracted and the real absolute position can be computed by subtracting 1 from the zone number and then adding the actually measured position RRPos in the zone thereto.

Moreover, the hatched area A of FIG. 5 indicates the real absolute position LPos computed by DSP 50. However, it is also probable that the real absolute position LPos computed by DSP 50 is not accurate. Therefore, the computed LPos is not used as the real absolute position and the estimated absolute position EstLPos is used as the real absolute position LPos.

Thereafter, FIG. 7 shows an example where a zone number of estimated absolute position is increased. In this example, the real absolute position in the preceding interrupt process is 31.0 and the current estimated absolute position is 28.5. The estimated position in the zone ERPos of this estimated absolute position is 2.5, the zone number is 9 and track number in the zone is 3.

The lower figure of FIG. 7 indicates a positional error Distance for the absolute position of the servo head in such a case that the estimated position in the zone ERPos is set to 2.5. When the zone number of estimated absolute position is equal to the zone number of real position, a positional error Distance is within ±2.0 and when the zone number of estimated absolute position is increased, a positional error Distance becomes larger than 2.0.

In addition, the hatched area A in FIG. 7 indicates a region where difference between the estimated total position and real position becomes 1.5 or larger as in the case of FIG. 6. It is probable that DSP 50 provides inaccurate real absolute position LPos. In this case, this LPos is not used as the real absolute position but the estimated absolute position ERPos is used as the real absolute position.

VII. Explanation about Initialization of Head Position Control Circuit

Thereafter, initialization of a head positioning control circuit of the present invention will be explained. Namely, under the condition that the power is turned ON for the disk drive, values of the real absolute position LPos of the servo head, estimated absolute position EstLPos, positional error DiffLPos between the real absolute position and estimated absolute position and moving velocity are not yet given and therefore operation of the head positioning control circuit conforming to the flowchart of FIG. 4 is impossible.

For this reason, the head positioning control circuit is required, in place of immediately starting the operation indicated in FIG. 5 upon throwing of the power switch of the disk drive, to make initialization of each value.

In actual, after the power switch is turned ON, the head positioning control circuit executes the rezero control for locating the servo head to the track having the number 0. For this rezero control, the velocity control similar to that in the flowchart of FIG. 5 is also executed. However, in this rezero control, the velocity control is not executed responsive to the number of tracks up to the track having the number 0, but the velocity control is executed only in the constant velocity. In this rezero control, DSP 50 does not have any information about absolute position of the servo head and has only a tentative position in such a case that any track is defined to have the number 0. When the rezero control is completed, the servo head is located to the track having the number 0. Accordingly, the absolute position of the servo head can be obtained by setting the absolute position of the servo head to zero in this timing.

Therefore, DSP 50 of the head positioning control circuit is required, before starting this rezero control, to obtain a moving velocity of the servo head. DSP 50 is capable of executing the velocity control in the rezero control with the process similar to that indicated in the flowchart of FIG. 5 by obtaining the moving velocity of the servo head. During this rezero control, the servo head is subjected to only velocity control at a constant velocity. After the servo head crosses the track having the number 0, a guard band recording the predetermined servo pattern is detected for reducing the velocity of head and low speed drive in the direction of inverse rotation in view of locating the servo head to the track having the number 0. Thereafter, the real absolute position of head LPos, estimated absolute position EstLPos and preceding absolute position EstLPos and preceding absolute position LastLPos computed in this timing are cleared to zero as the initialization.

Next, a method for computing moving velocity of the servo head will be explained with reference to FIG. 9.
(Step S80)

After the power switch of disk drive is turned ON, DSP 50 initiates the processes explained later.
(Step S81)

DSP 50 resets a time counter to set the count value to zero. This time counter executes the counting operation with, for example, a software. This time counter is used for measuring the period of a position signal.
(Step S82)

DSP 50 sets a motor drive current DrvCur as −100 to the resister within the output port 52. Here, the servo head is stopping, for example, at the most internal landing zone of a magnetic disk when the power switch is turned On. A value −100 of the motor drive current is a current value for driving the servo head to the inner side and it is sufficiently smaller than the value for driving the servo head at the maximum acceleration.
(Step S83)

DSP 50 waits for the period of 100 ms. This period is measured by another timer different from the time counter explained above. In addition, the period of 100 ms is sufficient for the servo head to move to the inner side of magnetic disk and for an actuator for moving the servo had to make press-contact with a mechanical stopper not permitting further movement. Of course, when the disk drive is normal, the servo head stops at the landing zone of the magnetic disk when the power is not supplied. But, the servo head does not stop at the landing zone due to some external force or other failure and thereby it may be located, for example, in the outer side of the magnetic disk. Therefore, the period of 100 ms is sufficient for the servo head to reach the most inner side of the magnetic disk from any position.
(Step S84)

DSP 50 sets a motor drive current value DrvCur as 100 to a register in the output port 52. This motor drive current value 100 is provided for moving the servo head to the outer side of magnetic disk. That is, the servo head is once located to the most inner side and is then moved to the outer side of the magnetic head.
(Step S85)

DSP 50 waits for a period of 20 ms. This period is measured by another timer different from the time counter explained above as explained in step S83. Moreover, the period of 20 ms is determined for giving the predetermined velocity to the servo head. Thereafter, DSP 50 computes the moving velocity of the servo head by sampling a position signal. That is, above period is set so that the servo head is located at the position sufficiently preceded for the most outer position of the magnetic disk.
(Step S86)

DSP 50 sets a motor drive current value DrvCur as 0 to a register in the output port 52. Thereby, a motor drive current becomes zero and the motor moves with its inertia. In the step explained later, DSP 50 computes the moving velocity of the servo head by sampling a positional signal.
(Step S87)

DSP 50 instructs digital conversion of the position signal PosN. Moreover, the signal to be converted digitally may be the signal PosQ. Any one of these is converted digitally.
(Step S88)

DSP 50 judges whether a digitally converted value is zero or not and returns to the step S87 when the value is not zero and then repeats the process of the step S87 until the digitally converted value becomes zero.
(Step S89)

DSP 50 starts the time counter when the position signal PosN becomes zero.
(Step S90)

DSP 50 instructs thereafter digital conversion of the position signal PosN.
(Step S91)

DSP 50 judges whether a digitally converted value is zero or not and returns to the step S89 when the value is not zero and then repeats the process of the step S89 until the digitally converted value becomes zero.
(Step S92)

DSP 50 steps the time counter. This time counter counts the period during the position signal PosN becomes zero again from preceding zero. On the other hand, as will be apparent from FIG. 3, when the position signal becomes zero from preceding zero, it means that the servo head has moved two tracks.
(Step S93)

DSP 50 computes the moving velocity of servo head. The moving distance of servo head is two tracks and the distance of two tracks is predetermined. Moreover, since the time required for moving these two tracks is measured, the moving velocity of servo head can be computed.

A value of the moving velocity of servo head can be computed from above processes.

Thereafter, DSP 50 computes the actually measured position in the zone RRPos of the servo head. Namely, since the absolute position of servo head cannot be detected until the servo head is located to the track of the number 0 by the rezero control, the actually measured position in the zone RRPos of the servo head when the velocity is computed is used as the tentative absolute position LPos of the servo head.

Thereafter, DSP 50 considers the tentative absolute position LPos of the servo head as the preceding real absolute position LastLPos of servo head.

In succession, DSP 50 obtained a moving distance of the servo head by multiplying the moving velocity of servo head computed in the step S93 with the time until the next interrupt process, adds the moving distance of servo head to the tentative real absolute position LPos in order to compute the estimated absolute position EstLPos of servo head in the next interrupt process. However, this estimated absolute position EstLPos is also a tentative position.

With the processes explained above, every information required has been set for velocity control. When the moving velocity of the servo head is computed, the servo head is moving with its inertia toward the outer side and DSP 50 transfers to the rezero control.

DSP 50 executes the velocity control similar to that in the flowchart of FIG. 5 during the rezero process. However, the object velocity is not changed responsive to the remaining number of tracks and the object velocity is constant.

Thereafter, when the rezero control is completed and the servo head is located to the position of the track having the number 0, DSP 50 converts the values of real absolute position LPos, estimated absolute position EstLPos and preceding real absolute position LastLPos into the absolute position by resetting these values to zero.

In succession, DSP 50 executes positional control in the track having the number 0 and waits for reception of servo instruction. This positional control is executed in accordance with the flowchart shown in FIG. 5.

IX. Explanation about Head Velocity and Motor Drive Current in Velocity Control

With reference to FIG. 8, practical signals and computed values for velocity control by the head positioning control circuit of the present invention will be explained. In this figure, all time axes are plotted on the horizontal axis.

Velocity indicates moving velocity of the servo head during the velocity control. In the figure, a dotted line indicates the object velocity VelObj.

PADrv indicates an output voltage signal of DAC 61 during the velocity control. This value is a voltage signal obtained by analogously conversion in DAC 51 of a motor drive current value DrvCur computed by DSP 50.

PosFine indicates a position signal in the track computed by DSP 50 during the seek operation. This value is an arithmetic value computed on the basis of the servo signal read by the servo head.

LPos indicates an absolute position of the servo head during the seek operation. This value is an arithmetic value computed by DSP 50. This value suggests that the servo head moves to the target track position from the current track position.

A preferred embodiment of the present invention has been explained, but the present invention is not limited only to this embodiment and allows any change or modification thereof only in the scope of the appended claims.

Effect of the Invention

The present invention provides a small size disk drive because it eliminates analog elements, particularly a track crossing pulse generating circuit which requires larger mounting area from the head positioning control circuit of the disk drive.

Moreover, the present invention provides a low price disk drive because it does not use expensive analog elements. In addition, the present invention provides a disk drive which does not show any change by aligning of the circuits and has improved reliability because the head positioning control circuit is formed by digital circuits.

Furthermore, the present invention provides a disk drive which is capable of computing the accurate absolute position of the servo head and preventing seek error of erroneously seeking the tracks because noise can be digitally eliminated during digital computation of the servo head position, in case noise element is superposed on the servo signal read by the servo head.

What is claimed is:

1. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:

positional signal generating means, responsive to the servo data read from the disk by the servo head, for generating an analog positional signal which indicates the position of the servo head in a respective zone;

digital converting means for receiving the analog positional signal and for digitally converting the analog positional signal into a digital value;

digital processing means, receiving the digital value and, at each computing time of the plurality of sequential computing times, for:

computing a position of the servo head in a respective zone on the disk based on the converted digital value, computing an actual position of the servo head in the present computing time based on the computed position of the servo head and the estimated position of the servo head computed in the preceding computing time, computing a moving distance of the servo head based on the actual position of the servo head computed in the present computing time and the actual position of the servo head computed in the preceding computing time, computing an estimated position of the servo head in the present computing time which indicates an estimated position reached by the servo head at the succeeding computing time, by adding the actual position of the servo head computed in the present computing time to the moving distance of the servo head, computing a moving velocity of the servo head based on the actual position of the servo head computed in the present computing time and the actual position of the servo head computed in the preceding computing time, computing a remaining number of tracks up to the target track, based on the actual position of the servo head computed in the present computing time, obtaining an object velocity of the servo head based on the remaining number of tracks, and computing a current value for driving the motor, based on the moving velocity of the servo head and the object velocity of the servo head; and motor drive means for receiving the current value computed by the digital processing means, generating an analog motor drive current signal from the current value, and driving the motor by the analog motor drive current signal.

2. A head positioning control apparatus as in claim 1, wherein the digital processing means computes the estimated position of the servo head in the present computing time by adding the moving distance of the servo head to the actual position of the servo head computed in the present computing time.

3. A head positioning control apparatus as in claim 1, wherein the digital processing means:

computes the moving distance of servo head from the difference between the actual position of the servo head computed in the present computing time and the actual position of the servo head computed in the preceding computing time, and computes the moving velocity of the servo head by digitally executing a low-pass filter process to the moving distance of servo head.

4. A head positioning control apparatus as in claim 1, wherein the motor drive means comprises:

analog converting means for generating an analog voltage signal by converting the current value into the analog voltage signal; and amplifier means for receiving the analog voltage signal and for converting the analog voltage signal to the analog motor drive current signal.

5. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:

positional signal generating means, responsive to the servo data read from the disk by the servo head, for generating an analog positional signal which indicates the position of the servo head in a respective zone;

digital converting means for receiving the analog positional signal and for digitally converting the analog positional signal into a digital value;

digital processing means, receiving the digital value and, at each computing time of the plurality of sequential computing times, for:

computing a position of the servo head in a respective zone on the disk based on the converted digital value, computing an actual position of the servo head in the present computing time based on the computed position of the servo head and the estimated position of the servo head computed in the preceding computing time of the plurality of sequential computing times, computing a moving velocity of the servo head based on the actual position of the servo head computed in the present computing time and the actual position of the servo head computed in the preceding computing time, computing an estimated position of the servo head in the present computing time which indicates an estimated position reached by the servo head at the succeeding computing time of the plurality of sequential computing times, by adding the actual position of the servo head computed in the present computing time to a moving distance obtained by multiplying the moving velocity of the servo head by the time interval from preceding computing time, computing a remaining number of tracks up to the target track, based on the actual position of the servo head computed in the present computing time, obtaining an object velocity of the servo head based on the remaining number of tracks, and computing a current value for driving the motor, based on the moving velocity of the servo head and the object velocity of the servo head; and motor drive means for receiving the current value computed by the digital processing means, generating an analog motor drive current signal from the current value, and driving the motor by the analog motor drive current signal.

6. A head positioning control apparatus as in claim 5, wherein the digital processing means:

computes a moving distance of the servo head in a predetermined period by multiplying the computed moving velocity of servo head with the predetermined period; and computes the estimated position of servo head in the present computing time by adding the computed moving distance of servo head within the predetermined period to the actual position of servo head computed in the present computing time.

7. A head positioning control apparatus as in claim 5, wherein the digital processing means:

computes the moving distance of the servo head from the difference between the actual position of the servo head computed in the present computing time and the actual position of the servo head computed in the preceding computing time, and computes the moving velocity of the servo head by digitally applying a low-pass filter process to the moving distance of the servo head.

8. A head positioning control apparatus as in claim 5, wherein the motor drive means comprises:

analog converting means for generating an analog voltage signal by converting the current value into an analog signal; and amplifier means for converting the analog voltage signal to the analog motor drive current signal and for supplying the analog motor drive current signal to the motor.

9. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:

positional signal generating means, responsive to the servo data read from the disk by the servo head, for generating an analog positional signal which indicates the position of the servo head in a respective zone;

digital converting means for receiving the analog positional signal and for digitally converting the analog positional signal into a digital value;

digital processing means, receiving the digital value and, at each computing time of the plurality of sequential computing times, for:
 computing a position of the servo head in a respective zone based on the converted digital value,
 computing an actual position of the servo head in the present computing time based on the computed position of the servo head and the estimated position of the servo head computed in the preceding computing time,
 adjusting the actual position of the servo head computed in the present computing time based on the actual position of the servo head computed in the present computing time and the estimated position of the servo head computed in the preceding computing time,
 computing a moving velocity of the servo head based on the actual position of the servo head computed in the present computing time and the actual position of the servo head computed in the preceding computing time,
 computing an estimated position of the servo head in the present computing time which indicates an estimated position reached by the servo head at the succeeding computing time, by adding the actual position of the servo head computed in the present computing time to the moving distance of the servo head obtained from the moving velocity of the servo head and the time interval from the preceding computing time,
 computing a remaining number of tracks up to the target track, based on the actual position of the servo head computed in the present computing time,
 obtaining an object velocity of the servo head based on the remaining number of tracks, and
 computing a current value for driving the motor, based on the moving velocity of the servo head and the object velocity of the servo head; and motor drive means for receiving the current value computed by the digital processing means, generating an analog motor drive current signal from the current value, and driving the motor by the analog motor drive current signal.

10. A head positioning control apparatus as in claim 9, wherein the digital processing means:
 computes an estimated error by subtracting the actual position of the servo head computed in the present computing time from the estimated position of the servo head computed in the preceding computing time,
 sets the estimated position of the servo head computed in the preceding computing time as the actual position of the servo head computed in the present computing time when the estimated error exceeds a predetermined value, and
 maintains the actual position of the servo head computed in the present computing time as the actual position of the servo head computed in the present computing time when the estimated error is smaller than the predetermined value.

11. A head positioning control apparatus as in claim 9, wherein the digital processing means:
 computes the moving distance of the servo head from the difference between the actual position of the servo head computed in the present computing time and the actual position of the servo head computed in the preceding computing time, and
 computes the moving velocity of the servo head by digitally applying a low-pass filter process to the moving distance of the servo head.

12. A head positioning control apparatus as in claim 9, wherein the motor drive means comprises:
 analog converting means for generating an analog voltage signal by converting the current value into an analog signal; and
 amplifier means for converting the analog voltage signal to the analog motor drive current signal and for supplying the analog motor drive current signal to the motor.

13. A method for positioning a servo head which reads data recorded on a disk of a disk drive system, the disk drive system operable with a disk having a plurality of tracks and servo data recorded on the disk, the disk being divided into a plurality of zones, each zone having a predetermined number of continuous tracks and the servo data indicates a position of a servo head on the disk when the servo head is reading the servo data, the disk drive system comprising a servo head which reads the servo data, a positional signal generating circuit which is responsive to the servo data read by the servo head to generate an analog positional signal indicating the position of the servo head on the disk, and a motor which is responsive to the analog positional signal to move the servo head to cross tracks on the disk, the method computing an estimated position of the servo head on the disk and an actual position of the servo head on the disk at each computing time of a plurality of sequential computing times to move the servo head to a target track, the method comprising:
 converting the analog positional signal into a digital value and, at each computing time of the plurality of sequential computing times,
  computing a position of the servo head in a respective zone based on the converted digital value,
  computing an actual position of the servo head in the present computing time based on the computed position of the servo head and the estimated position of the servo head computed in the preceding computing time,
  computing a moving distance of the servo head from the difference between the actual position of the servo head computed in the present computing time and the actual position of the servo head computed in the preceding computing time,
  computing an estimated position of the servo head in the present computing time which indicates an estimated position reached by the servo head at the succeeding computing time, by adding the actual position of the servo head computed in the present computing time to the moving distance of the servo head,
  computing a moving velocity of the servo head based on the moving distance,
  computing a number of remaining tracks up to the target track, based on the actual position of the servo head computed in the present computing time,
  obtaining an object velocity of the servo head based on the number of remaining tracks, and
  computing a current value for driving the motor, based on the moving velocity of the servo head and the object velocity of the servo head.

14. A method as in claim 13, wherein the step of computing an estimated position of the servo head in the present computing time further comprises:
computing an estimated position of the servo head in the present computing time by adding the moving distance of the servo head to the actual position of the servo head computed in the present computing time.

15. A method as in claim 13, further comprising the steps of:
computing, prior to computing the moving distance, an estimated error by subtracting the actual position of the servo head computed in the present computing time from the estimated position of the servo head computed in the preceding computing time; and
setting the estimated position of the servo head computed in the previous computing time as the actual position of the servo head computed in the present computing time when the estimated error exceeds a predetermined value.

16. A method for positioning a servo head which reads data recorded on a disk of a disk drive system, the disk drive system operable with a having a plurality of tracks and servo data recorded on the disk, the disk being divided into a plurality of zones, each zone having a predetermined number of continuous tracks and the servo data indicates a position of a servo head on the disk when the servo head is reading the servo data, the disk drive system comprising a servo head which reads the servo data, a positional signal generating circuit which is responsive to the servo data read by the servo head to generate an analog positional signal indicating the position of the servo head on the disk, and a motor which is responsive to the analog positional signal to move the servo head to cross tracks on the disk, the method computing an estimated position of the servo head on the disk and an actual position of the servo head on the disk at each computing time of a plurality of sequential computing times to move the servo head to a target track, the method comprising:
converting the analog positional signal into a digital value and, at each computing time of the plurality of sequential computing times,
computing a position of the servo head in a respective zone based on the converted digital value,
computing an actual position of the servo head in the present computing time based on the computed position of the servo head and the estimated position of the servo head computed in the preceding computing time,
computing a moving distance of the servo head from the difference between the actual position of the servo head computed in the present computing time and the actual position of the servo head computed in the preceding computing time,
computing a moving velocity of the servo head based on the moving distance of the servo head,
computing a moving distance of the servo head within the time interval from the preceding computing time by multiplying the computed moving velocity of the servo head with the time interval,
computing an estimated position of the servo head in the present computing time which indicates an estimated position reached by the servo head at the succeeding computing time, by adding the actual position of the servo head computed in the present computing time to the moving distance of servo head in the time interval from the preceding computing time,
computing a number of remaining tracks up to the target track, based on the actual position of the servo head computed in the present computing time,
obtaining an object velocity of the servo head based on the number of remaining tracks, and
computing a current for driving the motor, based on the moving velocity of the servo head and the object velocity of the servo head.

17. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:
positional signal generating means, responsive to the servo data read from the disk by the servo head, for generating an analog positional signal which indicates the position of the servo head in a respective zone;
digital converting means for receiving the analog positional signal and for digitally converting the analog positional signal into a digital value;
digital processing means, receiving the digital value, and, at each computing time of the plurality of computing times, for computing a current value for driving the motor by:
computing a position of the servo head in a respective zone on the disk based on the converted digital value,
computing an actual position of the servo head in the present computing time based on the computed position of the servo head and the estimated position of the servo head computed in the preceding computing time,
computing a moving distance of the servo head based on the actual position of the servo head computed in the present computing time and the actual position of the servo head computed in the preceding computing time,
computing an estimated position of the servo head in the present computing time which indicates an estimated position reached by the servo head at the succeeding computing time of the plurality of sequential computing times, by adding the actual position of the servo head computed in the present computing time to the moving distance of the servo head,
computing a moving velocity of the servo head based on the actual position of the servo head computed in the present computing time and the actual position of the servo head computed in the preceding computing time, without requiring the use of a measured current value,
computing a remaining number of tracks up to the target track, based on the actual position of the servo head computed in the present computing time,
obtaining an object velocity of the servo head based on the remaining number of tracks, and
computing a current value for driving the motor, based on the moving velocity of the servo head and the object velocity of the servo head; and motor drive means for receiving the current value computed by the digital processing means, generating an analog motor drive current signal from the current value, and driving the motor by the analog motor drive current signal.

18. A head positioning control apparatus as in claim 17, wherein the digital processing means computes the estimated position of the servo head in the present computing time by adding the moving distance of the servo head to the actual position of the servo head computed in the present computing time.

19. A head positioning control apparatus as in claim 17, wherein the digital processing means:
   computes the moving distance of servo head from difference between the actual position of the servo head computed in the present computing time and the actual position of the servo head computed in the preceding computing time, and
   computes the moving velocity of the servo head by digitally executing a low-pass filter process to the moving distance of servo head.

20. A head positioning control apparatus as in claim 17, wherein the motor drive means comprises:
   analog converting means for generating an analog voltage signal by converting the current value into the analog voltage signal; and
   amplifier means for receiving the analog voltage signal and for converting the analog voltage signal to the analog motor drive current signal.

21. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:
   positional signal generating means, responsive to the servo data read from the disk by the servo head, for generating an analog positional signal which indicates the position of the servo head in a respective zone;
   digital converting means for receiving the analog positional signal and for digitally converting the analog positional signal into a digital value;
   digital processing means, receiving the digital value, and, at each computing time of the plurality of sequential computing times, for computing a current value for driving the motor by:
      computing a position of the servo head in a respective zone on the disk based on the converted digital value,
      computing an actual position of the servo head in the present computing time based on the computed position of the servo head and the estimated position of the servo head computed in the preceding computing time,
      computing a moving velocity of the servo head based on the actual position of the servo head computed in the present computing time and the actual position of the servo head computed in the preceding computing time, without requiring the use of a measured current value,
      computing an estimated position of the servo head in the present computing time which indicates an estimated position reached by the servo head at the succeeding computing time of the plurality of sequential computing times, by adding the actual position of the servo head computed in the present computing time to the moving distance of the servo head obtained from the moving velocity of the servo head and the time interval from the preceding computing time,
      computing a remaining number of tracks up to the target track, based on the actual position of the servo head computed in the present computing time,
      obtaining an object velocity of the servo head based on the remaining number of tracks, and
      computing a current value for driving the motor, based on the moving velocity of the servo head and the object velocity of the servo head; and
   motor drive means for receiving the current value computed by the digital processing means, generating an analog motor drive current signal from the current value, and driving the motor by the analog motor drive current signal.

22. A head positioning control apparatus as in claim 21, wherein the digital processing means:
   computes a moving distance of the servo head in a predetermined period by multiplying the computed moving velocity of servo head with the predetermined period; and
   computes the estimated position of servo head in the present computing time by adding the computed moving distance of servo head within the predetermined period to the actual position of servo head computed in the present computing time.

23. A head positioning control apparatus as in claim 21, wherein the digital processing means:
   computes the moving distance of the servo head from the difference between the actual position of the servo head computed in the present computing time and the actual position of the servo head computed in the preceding computing time, and
   computes the moving velocity of the servo head by digitally applying a low-pass filter process to the moving distance of the servo head.

24. A head positioning control apparatus as in claim 21, wherein the motor drive means comprises:
   analog converting means for generating an analog voltage signal by converting the current value into an analog signal; and
   amplifier means for converting the analog voltage signal to the analog motor drive current signal and for supplying the analog motor drive current signal to the motor.

25. A head positioning control apparatus of a disk drive system, the disk drive system operable with a disk having a plurality of tracks and servo data recorded on the disk, the disk drive system comprising a servo head which reads the servo data and a motor which moves the servo head to cross tracks on the disk, the disk being divided into a plurality of zones, each zone having a predetermined number of continuous tracks and the servo data indicates a position of the servo head on the disk when the servo head is reading the servo data, the head positioning control apparatus computing an estimated position of the servo head on the disk and an actual position of the servo head on the disk at each computing time of a plurality of sequential computing times to move the servo head to a target track, the head positioning control apparatus comprising:

positional signal generating means, responsive to the servo data read from the disk by the servo head, for generating an analog positional signal which indicates the position of the servo head in a respective zone;

digital converting means for receiving the analog positional signal and for digitally converting the analog positional signal into a digital value;

digital processing means, receiving the digital value, and, at each computing time of the plurality of sequential computing times, for computing a current value for driving the motor by:

computing a position of the servo head in a respective zone based on the converted digital value, computing an actual position of the servo head in the present computing time based on the computed position of the servo head and the estimated position of the servo head computed in the preceding computing time, computing a moving velocity of the servo head based on the actual position of the servo head computed in the present computing time and the actual position of the servo head computed in the preceding computing time, without requiring the use of a measured current value, computing an estimated position of the servo head in the present computing time which indicates an estimated position reached by the servo head at the succeeding computing time of the plurality of sequential computing times, by adding the actual position of the servo head computed in the present computing time to the moving distance of the servo head obtained from the moving velocity of the servo head and the time interval from the preceding computing time, computing a remaining number of tracks up to the target track, based on the actual position of the servo head computed in the present computing time, obtaining an object velocity of the servo head based on the remaining number of tracks, and computing a current value for driving the motor, based on the moving velocity of the servo head and the object velocity of the servo head; and motor drive means for receiving the current value computed by the digital processing means, generating an analog motor drive current signal from the current value, and driving the motor by the analog motor drive current signal.

26. A head positioning control apparatus as in claim 25, wherein the digital processing means:

computes an estimated error by subtracting the actual position of the servo head computed in the present computing time from the estimated position of the servo head computed in the preceding computing time, sets the estimated position of the servo head in the preceding computing time as the actual position of the servo head in the present computing time when the estimated error exceeds a predetermined value, and maintains the actual position of the servo head computed in the present computing time as the actual position of the servo head computed in the present computing time when the estimated error is smaller than the predetermined value.

27. A head positioning control apparatus as in claim 25, wherein the digital processing means:

computes the moving distance of the servo head from the difference between the actual position of the servo head computed in the present computing time and the actual position of the servo head computed in the preceding computing time, and computes the moving velocity of the servo head by digitally applying a low-pass filter process to the moving distance of the servo head.

28. A head positioning control apparatus as in claim 25, wherein the motor drive means comprises:

analog converting means for generating an analog voltage signal by converting the current value into an analog signal; and amplifier means for converting the analog voltage signal to the analog motor drive current signal and for supplying the analog motor drive current signal to the motor.

29. A method for positioning a servo head which reads data recorded on a disk of a disk drive system, the disk drive system operable with a disk having a plurality of tracks and servo data recorded on the disk, the disk being divided into a plurality of zones, each zone having a predetermined number of continuous tracks and the servo data indicates a position of a servo head on the disk when the servo head is reading the servo data, the disk drive system comprising a servo head which reads the servo data, a positional signal generating circuit which is responsive to the servo data read by the servo head to generate an analog positional signal indicating the position of the servo head on the disk, and a motor which is responsive to the analog positional signal to move the servo head to cross tracks on the disk, the method computing an estimated position of the servo head on the disk and an actual position of the servo head on the disk at each computing time of a plurality of sequential computing times to move the servo head to a target track, the method comprising:

converting the analog positional signal into a digital value, and, at each computing time of the plurality of sequential computing times, computing a position of the servo head in a respective zone based on the converted digital value, computing an actual position of the servo head in the present computing time based on the computed position of the servo head and the estimated position of the servo head computed in the preceding computing time, computing a moving distance of the servo head from the difference between the actual position of the servo head computed in the present computing time and the actual position of the servo head computed in the preceding computing time, computing an estimated position of the servo head in the present computing time which indicates an estimated position reached by the servo head at the succeeding computing time of the plurality of sequential computing times, by adding the actual position of the servo head computed in the present computing time to the moving distance of the servo head, computing a moving velocity of the servo head based on the moving distance, computing a number of remaining tracks up to the target track, based on the actual position of the servo head computed in the present computing time, obtaining an object velocity of the servo head based on the number of remaining tracks, and computing a current value for driving the motor, based on the moving velocity of the servo head and the object velocity of the servo head without requiring the use of a measured current value for the step of computing a moving velocity.

30. A method as in claim 29, wherein the step of computing an estimated position of the servo head in the present computing time further comprises:

computing an estimated position of the servo head in the present computing time by adding the moving distance of the servo head to the actual position of the servo head computed in the present computing time.

31. A method as in claim 29, further comprising the steps of:

computing, prior to computing the moving distance, an estimated error by subtracting the actual position of the servo head computed in the present computing time from the estimated position of the servo head computed in the preceding computing time; and setting the estimated position of the servo head computed in the previous computing time as the actual position of the servo head computed in the present computing time when the estimated error exceeds a predetermined value.

32. A method for positioning a servo head which reads data recorded on a disk of a disk drive system, the disk drive system operable with a disk having a plurality of tracks and servo data recorded on the disk, the disk being divided into a plurality of zones, each zone having a predetermined number of continuous tracks and the servo data indicates a position of a servo head on the disk when the servo head is reading the servo data, the disk drive system comprising a servo head which reads the servo data, a positional signal generating circuit which is responsive to the servo data read by the servo head to generate an analog positional signal indicating the position of the servo head on the disk, and a motor which is responsive to the analog positional signal to move the servo head to cross tracks on the disk, the method computing an estimated position of the servo head on the disk and an actual position of the servo head on the disk at each computing time of a plurality of sequential computing times to move the servo head to a target track, the method comprising:

converting the analog positional signal into a digital value, and, at each computing time of the plurality of sequential computing times, computing a position of the servo head in a respective zone based on the converted digital value, computing an actual position of the servo head in the present computing time based on the computed position of the servo head and the estimated position of the servo head computed in the preceding computing time, computing a moving distance of the servo head from the difference between the actual position of the servo head computed in the present computing time and the actual position of the servo head computed in the preceding computing time, computing a moving velocity of the servo head based on the moving distance of the servo head, computing a moving distance of the servo head within the time interval from the preceding computing time of the plurality of sequential computing times by multiplying the computed moving velocity of the servo head with time interval, computing an estimated position of the servo head in the present computing time which indicates an estimated position reached by the servo head at the succeeding computing time of the plurality of sequential computing times, by adding the moving distance of servo head in the time interval from the preceding computing time to the actual position of servo head computed in the present computing time, computing a number of remaining tracks up to the target track, based on the actual position of the servo head computed in the present computing time, obtaining an object velocity of the servo head based on the number of remaining tracks, and computing a current for driving the motor, based on the moving velocity of the servo head and the object velocity of the servo head without requiring the use of a measured current value for the step of computing a moving velocity.

* * * * *

UNITED STATES PATENT AND TRADEMARK OFFICE
CERTIFICATE OF CORRECTION

PATENT NO. : 5,844,744
DATED : December 1, 1998
INVENTOR(S) : Nobuyuki SUZUKI et al.

It is certified that error appears in the above-identified patent and that said Letters Patent is hereby corrected as shown below:

On the title page, [56] References Cited, U.S. Patent Documents, insert --5,021,898, 06/1991, Sakai et al., 360/78.04--.

Signed and Sealed this

Thirteenth Day of July, 1999

Attest:

Attesting Officer

Q. TODD DICKINSON

Acting Commissioner of Patents and Trademarks